Figure 1B:
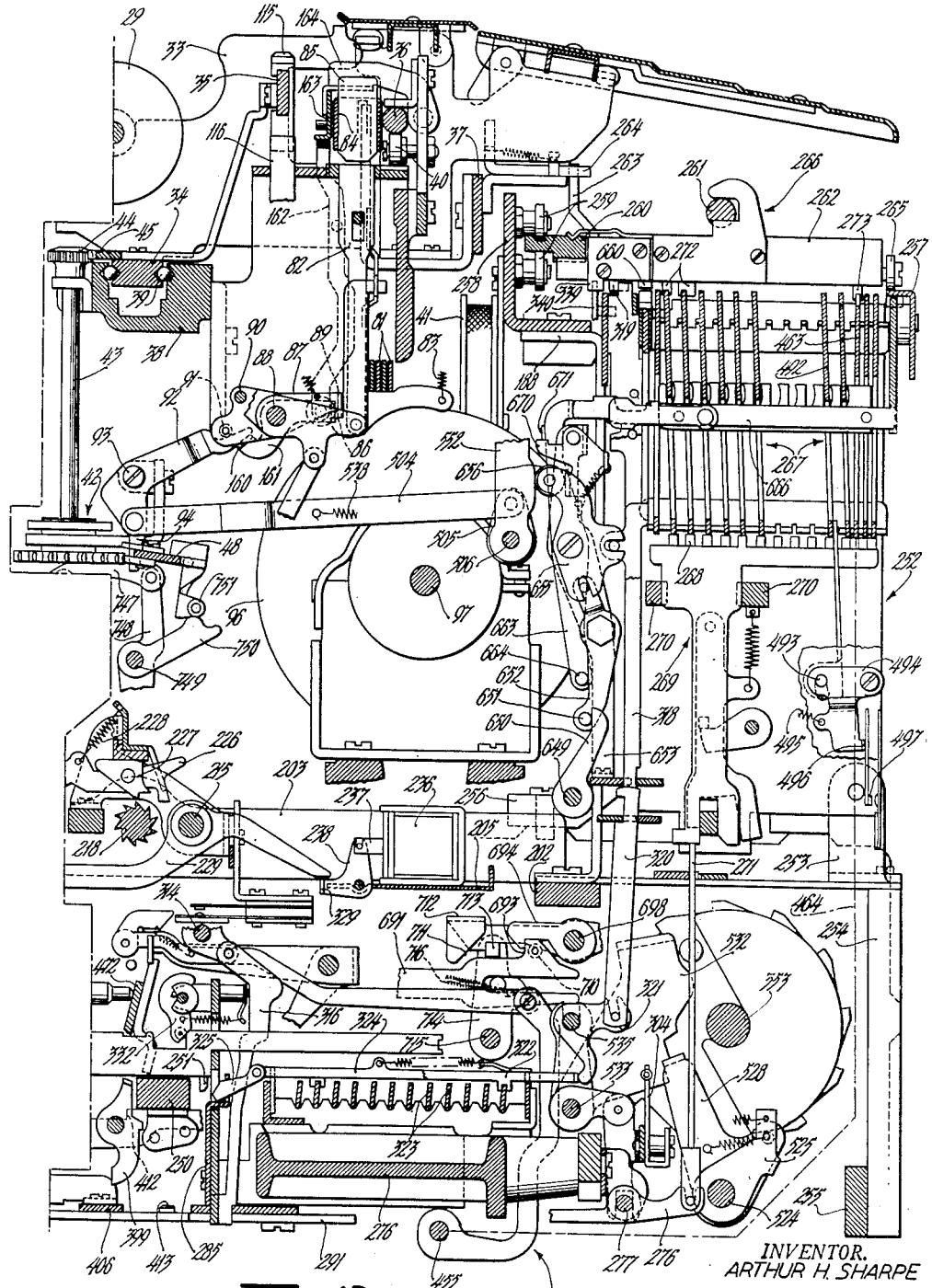

April 26, 1955 — A. H. SHARPE — 2,707,076
COMBINED TYPEWRITING AND ACCOUNTING MACHINE
Filed April 20, 1951 — 14 Sheets-Sheet 1
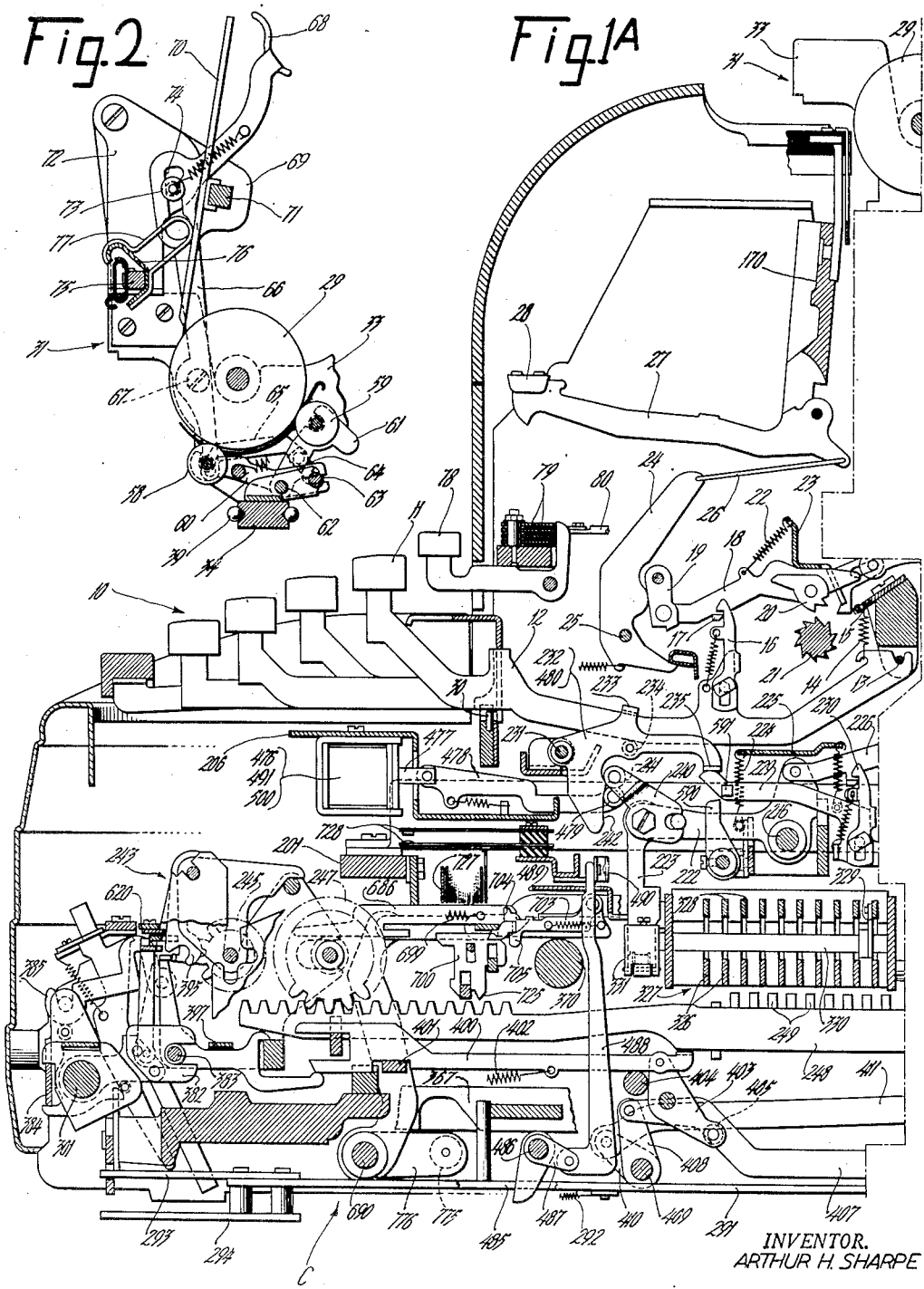
INVENTOR.
ARTHUR H. SHARPE
BY
Jesse A. Holton
ATTORNEY April 26, 1955  A. H. SHARPE  2,707,076
COMBINED TYPEWRITING AND ACCOUNTING MACHINE
Filed April 20, 1951  14 Sheets-Sheet 2

INVENTOR.
ARTHUR H. SHARPE
BY
Jesse A. Holton
ATTORNEY

April 26, 1955   A. H. SHARPE   2,707,076
COMBINED TYPEWRITING AND ACCOUNTING MACHINE
Filed April 20, 1951   14 Sheets-Sheet 3
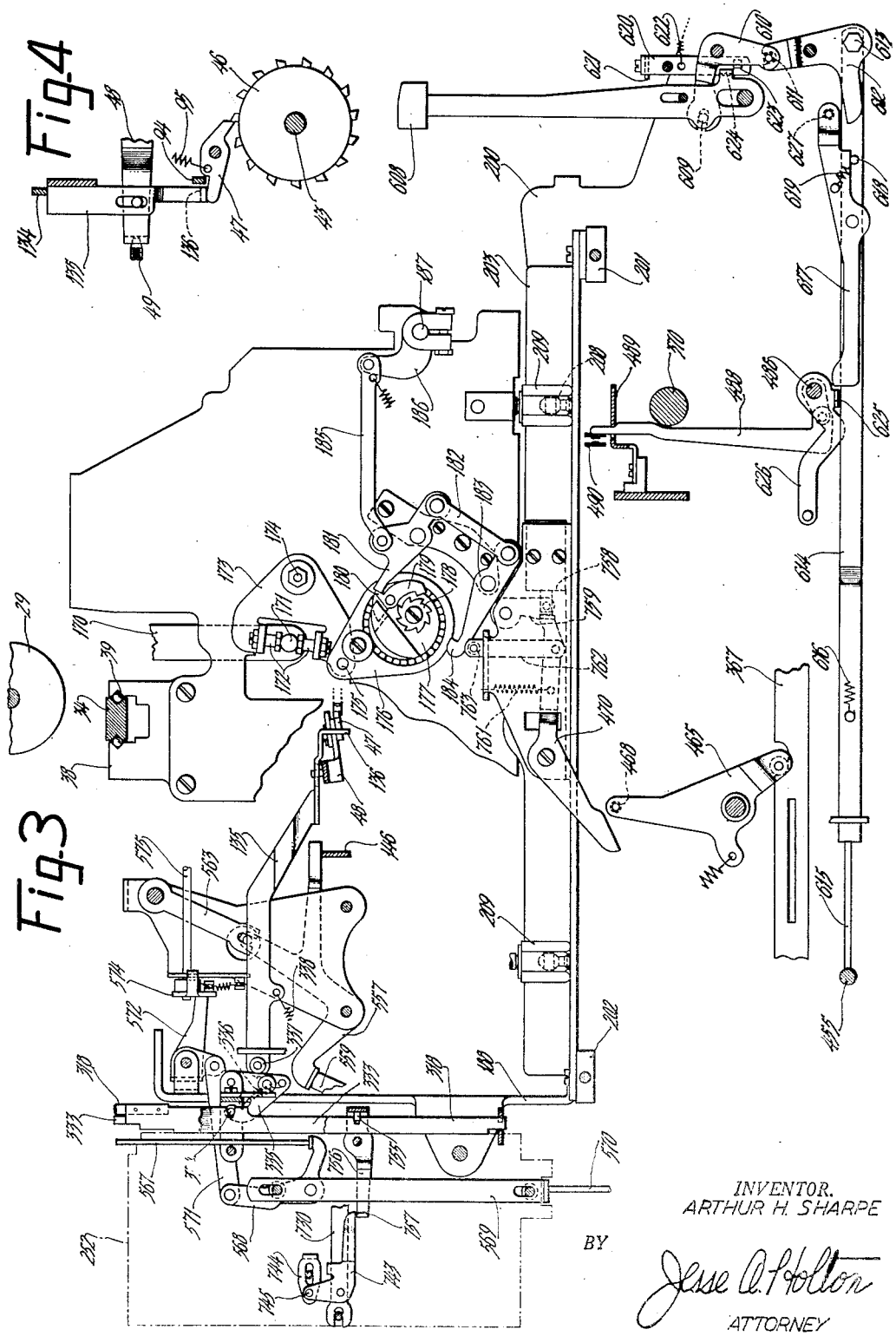
INVENTOR.
ARTHUR H. SHARPE
BY
Jesse A. Holton
ATTORNEY April 26, 1955 A. H. SHARPE 2,707,076
COMBINED TYPEWRITING AND ACCOUNTING MACHINE
Filed April 20, 1951 14 Sheets-Sheet 4

INVENTOR.
ARTHUR H. SHARPE
BY
Jesse A. Holton
ATTORNEY

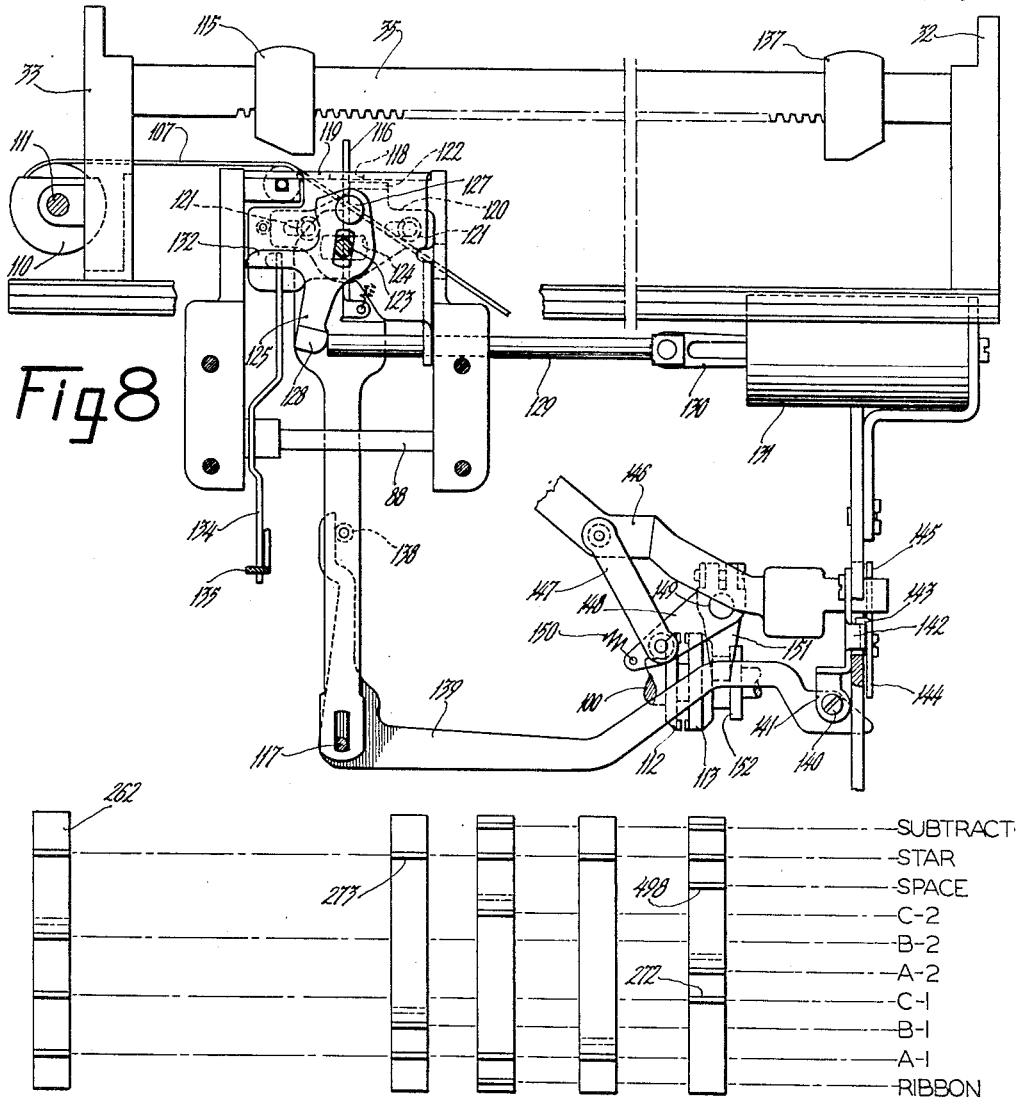

April 26, 1955 A. H. SHARPE 2,707,076
COMBINED TYPEWRITING AND ACCOUNTING MACHINE
Filed April 20, 1951 14 Sheets-Sheet 7
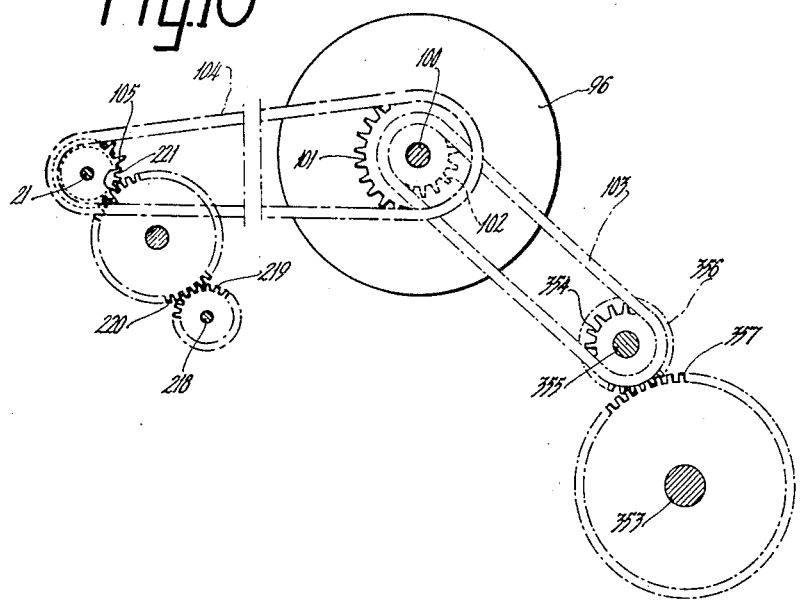
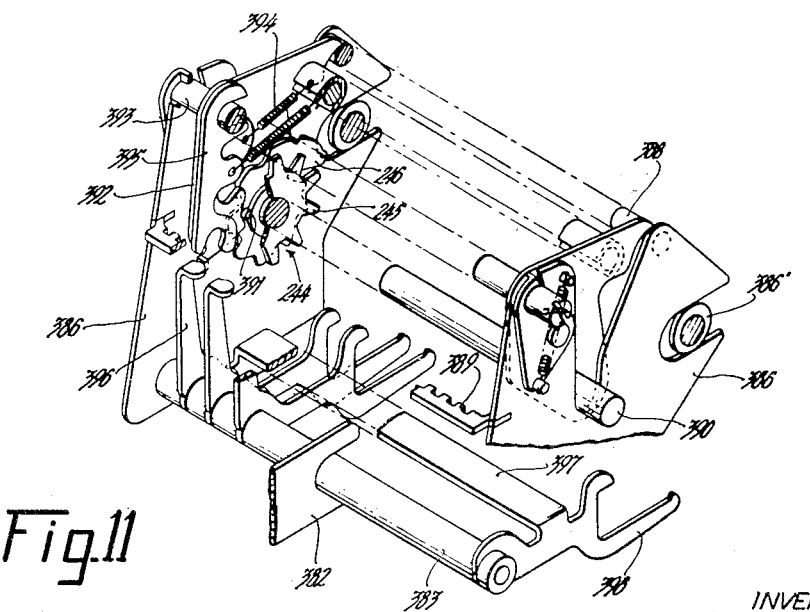
INVENTOR
ARTHUR H. SHARPE
BY
Jesse A. Holton
ATTORNEY April 26, 1955      A. H. SHARPE      2,707,076
COMBINED TYPEWRITING AND ACCOUNTING MACHINE
Filed April 20, 1951      14 Sheets-Sheet 8

INVENTOR
ARTHUR H. SHARPE
BY
Jesse A. Holton
ATTORNEY

April 26, 1955
A. H. SHARPE
2,707,076
COMBINED TYPEWRITING AND ACCOUNTING MACHINE
Filed April 20, 1951
14 Sheets-Sheet 9
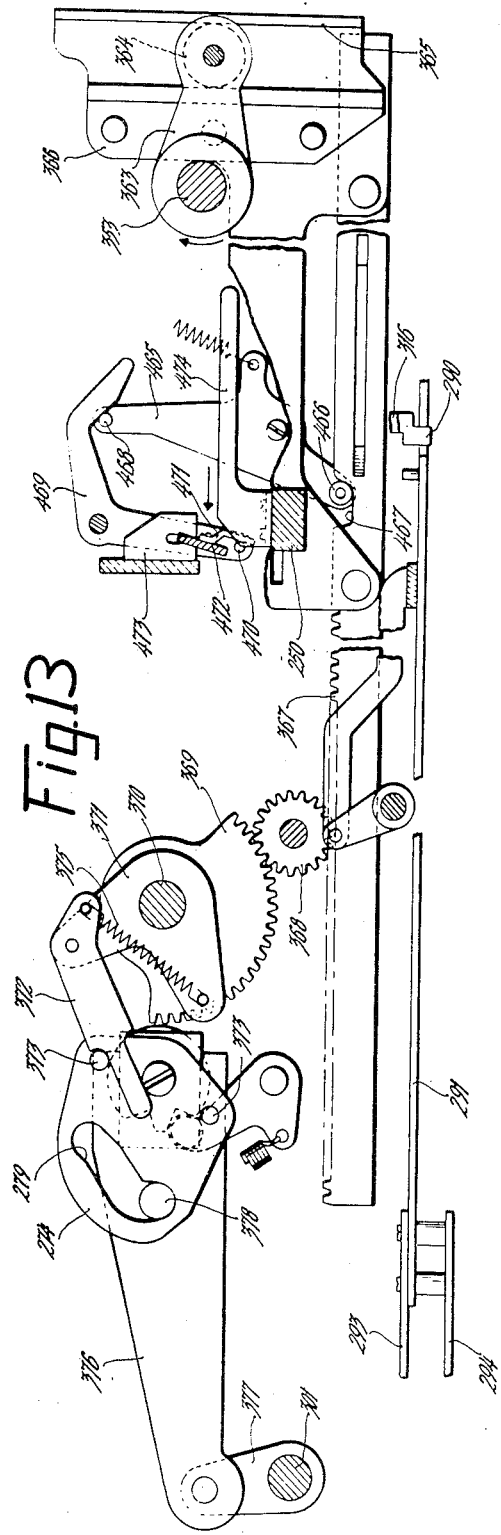
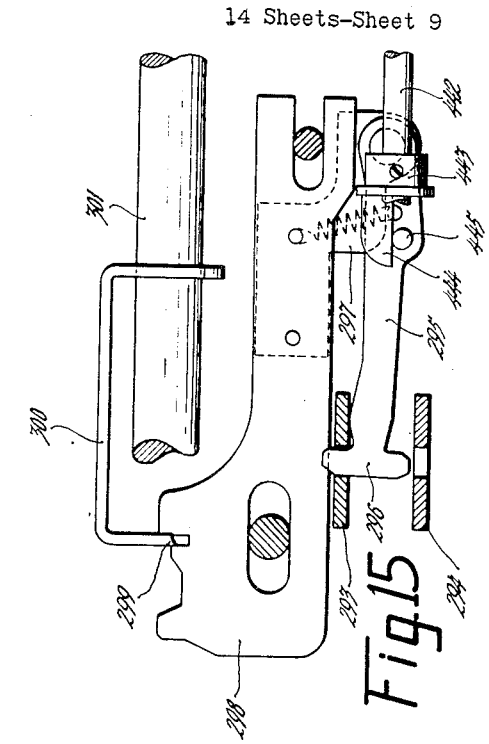
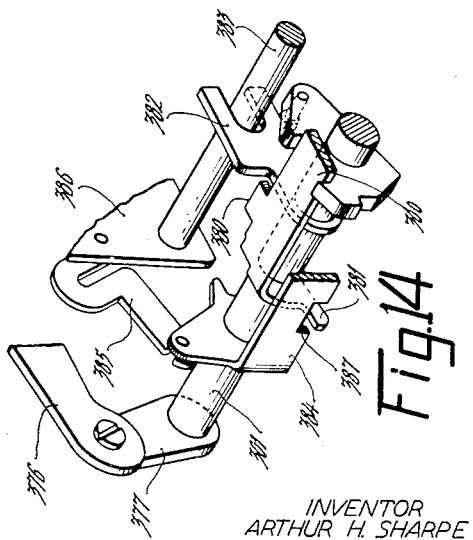
INVENTOR
ARTHUR H. SHARPE
BY
Jesse A. Holton
ATTORNEY

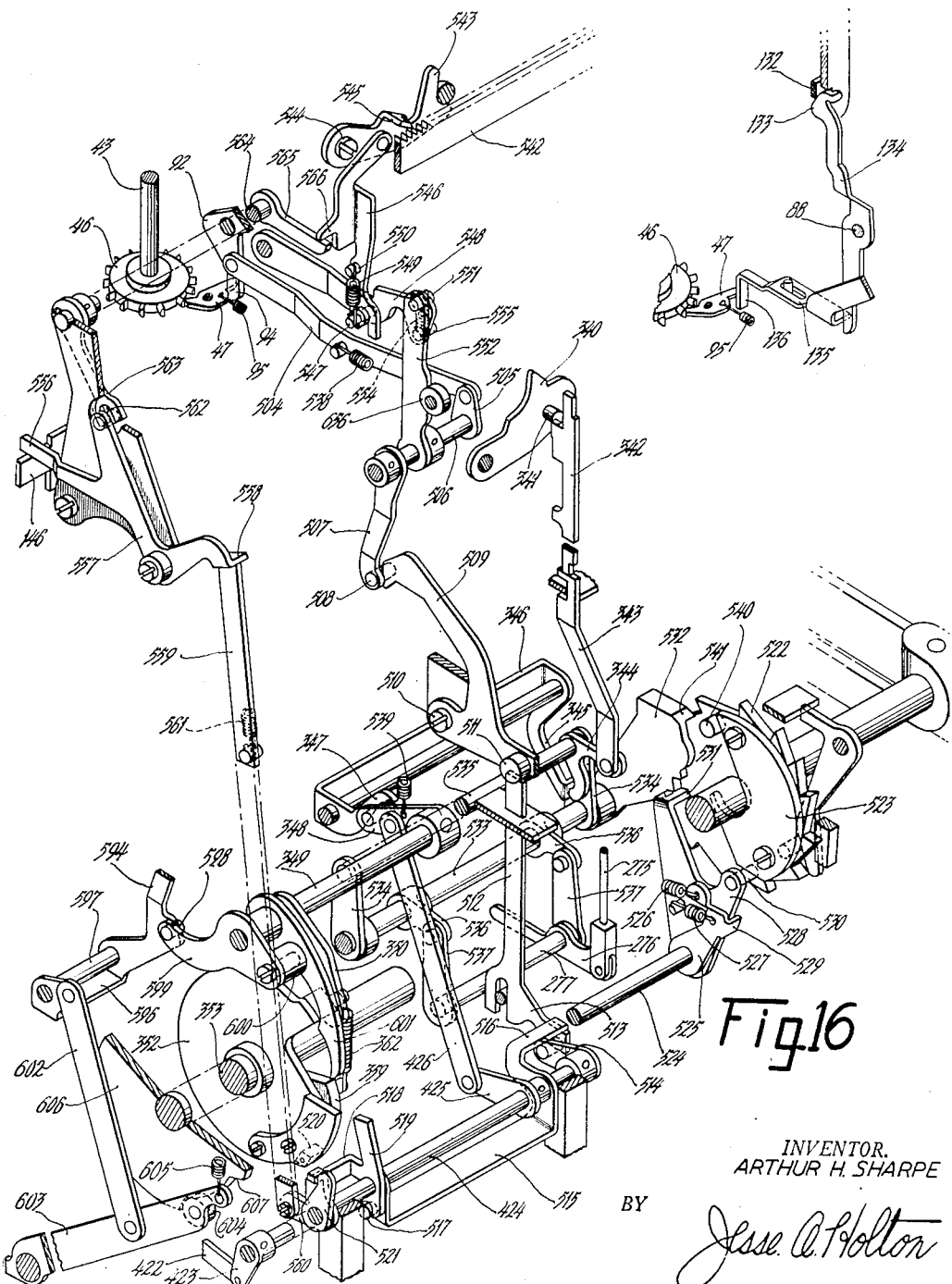

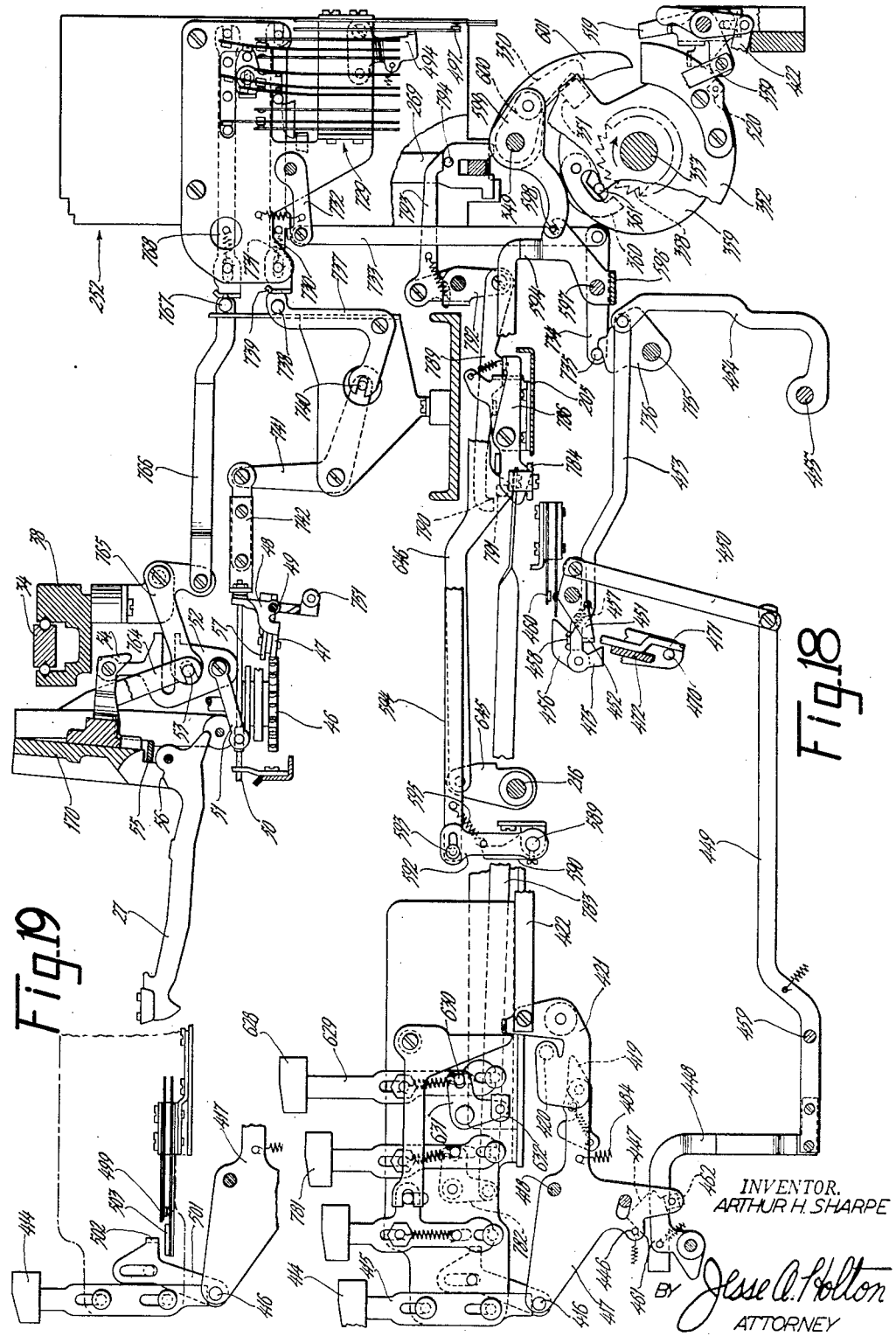

April 26, 1955     A. H. SHARPE     2,707,076
COMBINED TYPEWRITING AND ACCOUNTING MACHINE
Filed April 20, 1951     14 Sheets-Sheet 12
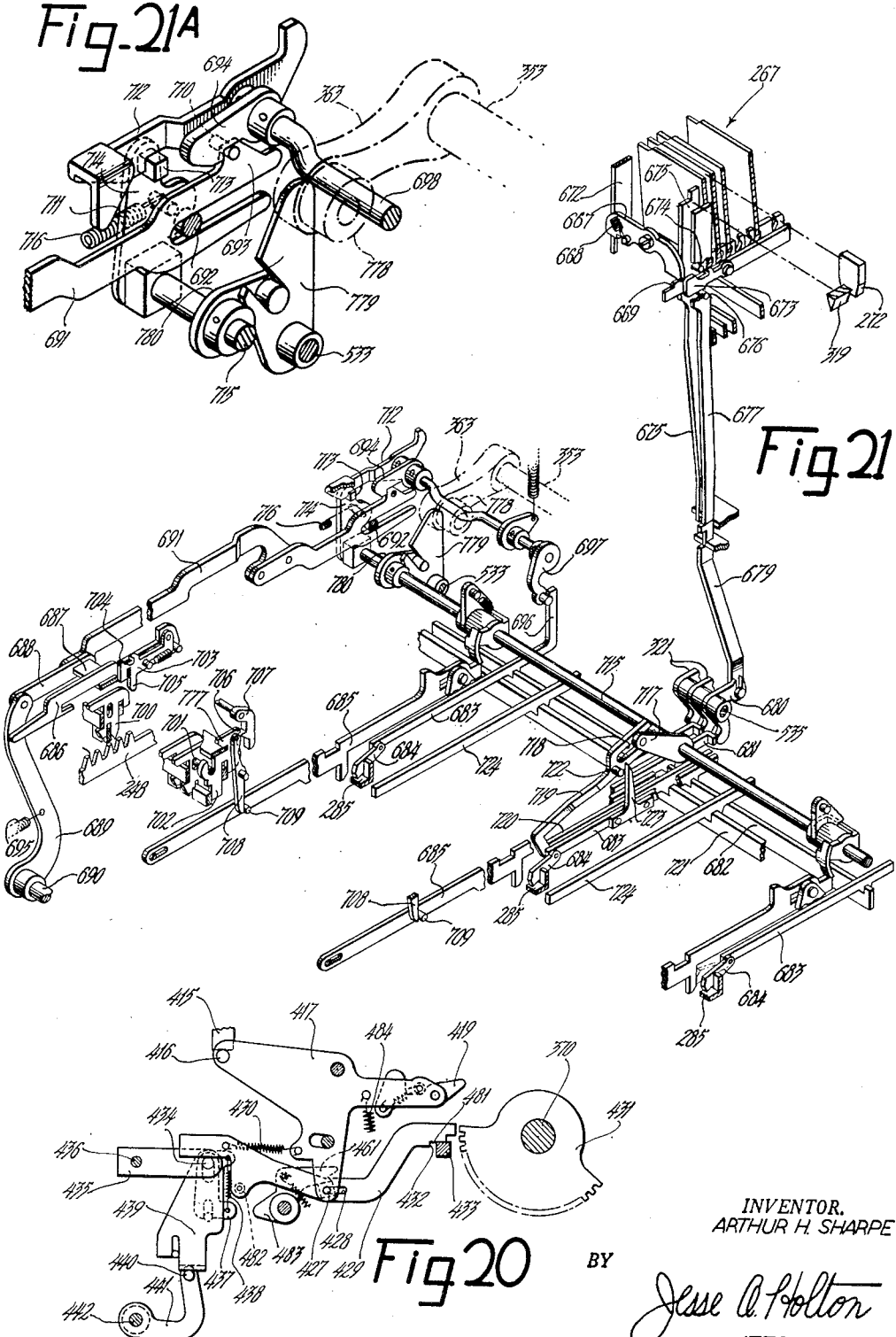
INVENTOR.
ARTHUR H. SHARPE
BY
Jesse A. Holton
ATTORNEY April 26, 1955
A. H. SHARPE
2,707,076
COMBINED TYPEWRITING AND ACCOUNTING MACHINE
Filed April 20, 1951
14 Sheets-Sheet 13
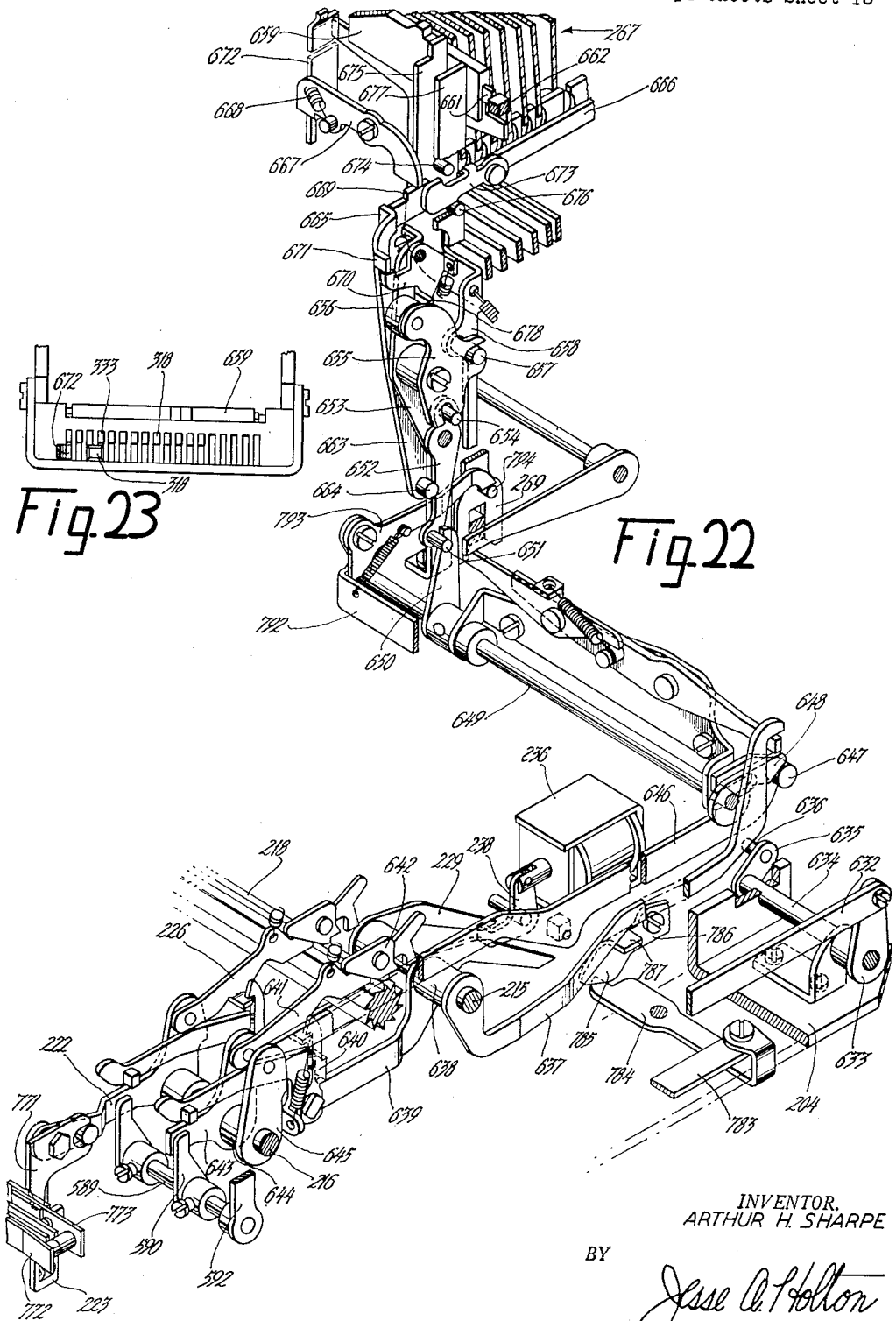
INVENTOR.
ARTHUR H. SHARPE
BY
Jesse A. Holton
ATTORNEY

United States Patent Office

2,707,076
Patented Apr. 26, 1955

2,707,076

COMBINED TYPEWRITING AND ACCOUNTING MACHINE

Arthur H. Sharpe, West Hartford, Conn., assignor to Underwood Corporation, New York, N. Y., a corporation of Delaware Application April 20, 1951, Serial No. 222,017

9 Claims. (Cl. 235—60.12)

The present invention relates to combined typewriting and accounting machines, also known as bookkeeping machines. The machine with which the invention is concerned is particularly adapted for making out statements of account, and is so constructed that descriptive text, as well as amounts, may be typed upon a work sheet by manipulation of the keys of its typewriter keyboard. Machines of the type with which this invention is concerned are well known and are exemplified in Patents Nos. 2,192,365 and 2,372,681, in the name of H. L. Pitman, No. 2,405,268, in the name of R. W. Pitman, as well as many others.

Machines over which the present machine is an improvement are adapted to print amounts in a plurality of columns on a work sheet. In certain of the columns the amounts are added into a register and in other columns the printed amounts are entered into a register subtractively. Columnar totals and sub-totals may be automatically printed at will by manipulation of a single key. Since all of the registers of the machine may be operated both additively and subtractively, cross totals or line totals may also be accumulated, and these totals may be automatically printed; in fact, the normal operation of the machine is to print the cross total at the end of each line.

The machine has a normal program of columnar operation which is controlled by a control plate or mechanical "brain," whereby different registers are selected for operation in different columns and in some of the columns certain registers are caused to add and in other columns certain registers are caused to subtract. In the machine of the present invention, the automatically selected program may be altered at the will of the operator, so that if in a certain column, registers are automatically conditioned for addition they may be caused to perform a subtractive operation, and vice versa. Means is provided to automatically print a distinctive symbol after all amounts which are entered in a manner other than the normal manner so that by inspection of the work sheet it may be readily determined that the normal operation of the machine was altered.

In certain accounting procedures, the extreme right hand column on the work sheet is a "proof" column. While the "proof" may be obtained in various ways, in general an amount is manually entered subtractively in this column into a register wherein that same amount has previously been accumulated negatively, to thereby clear the "proof" register. As proof that this operation has actually resulted in clearing the register, means is provided to automatically print a distinctive symbol after the amount.

It is desirable that all of the proof symbols be vertically aligned, so that as the carriage steps toward the next letter space position an automatic carriage return operation may be initiated to return the carriage to position for printing in the first column on the sheet. Since the "proof" may be obtained as a result of a reversing operation, means has been provided to print the reversing symbol after the amount and the clear-sign or proof symbol after that. In case the reversing operation is not used in the "proof" column, a blank space is left between the lowest order digit of the amount and the clear-sign, so that in any event, after the clear-sign is printed an automatic carriage return operation is initiated. To accomplish this is one of the objects of the present invention.

It is the primary object of this invention to provide a machine of the above described type which embodies mechanical and electrical improvements over previously known machines and which as a result of these improvements is easier to operate and maintain.

It is another object of this invention to provide a bookkeeping machine which is composed of a plurality of readily separable sections, whereby the assembly of the machine is greatly facilitated and said machine may be readily taken apart for adjustment and repair.

It is still another object of the invention to provide a bookkeeping machine having means whereby the normal program of operation may be readily reversed at will and which will automatically print a distinctive symbol whenever such reversing operation is resorted to.

These and further objects, features and advantages of the invention will become more readily apparent as the description of a preferred embodiment thereof proceeds.

Figure 5:
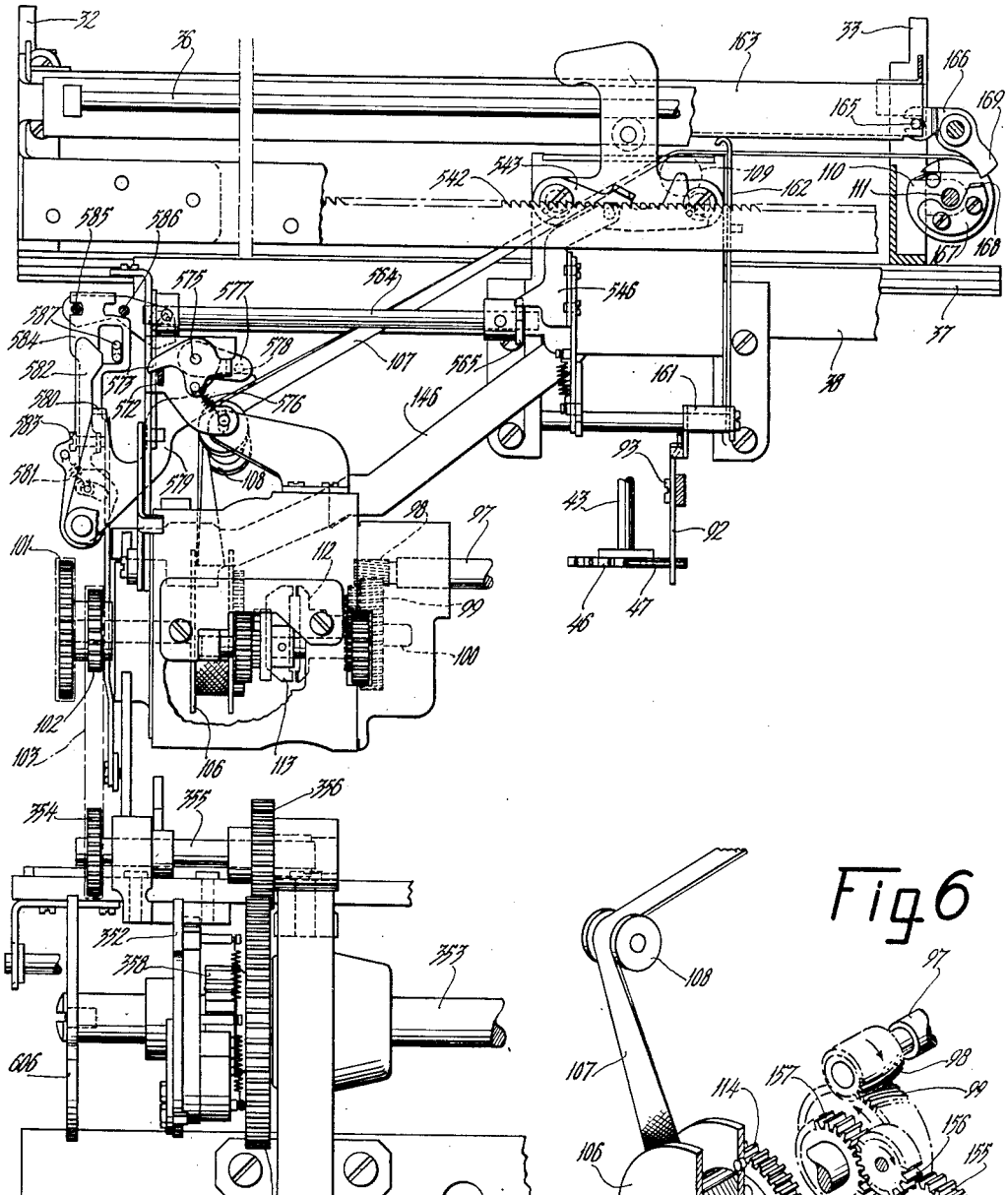
Figure 6:
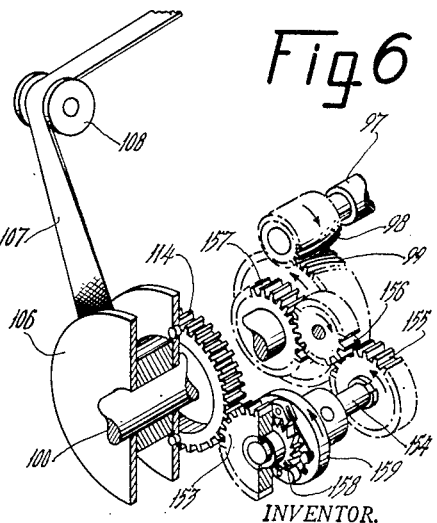
Figure 7:
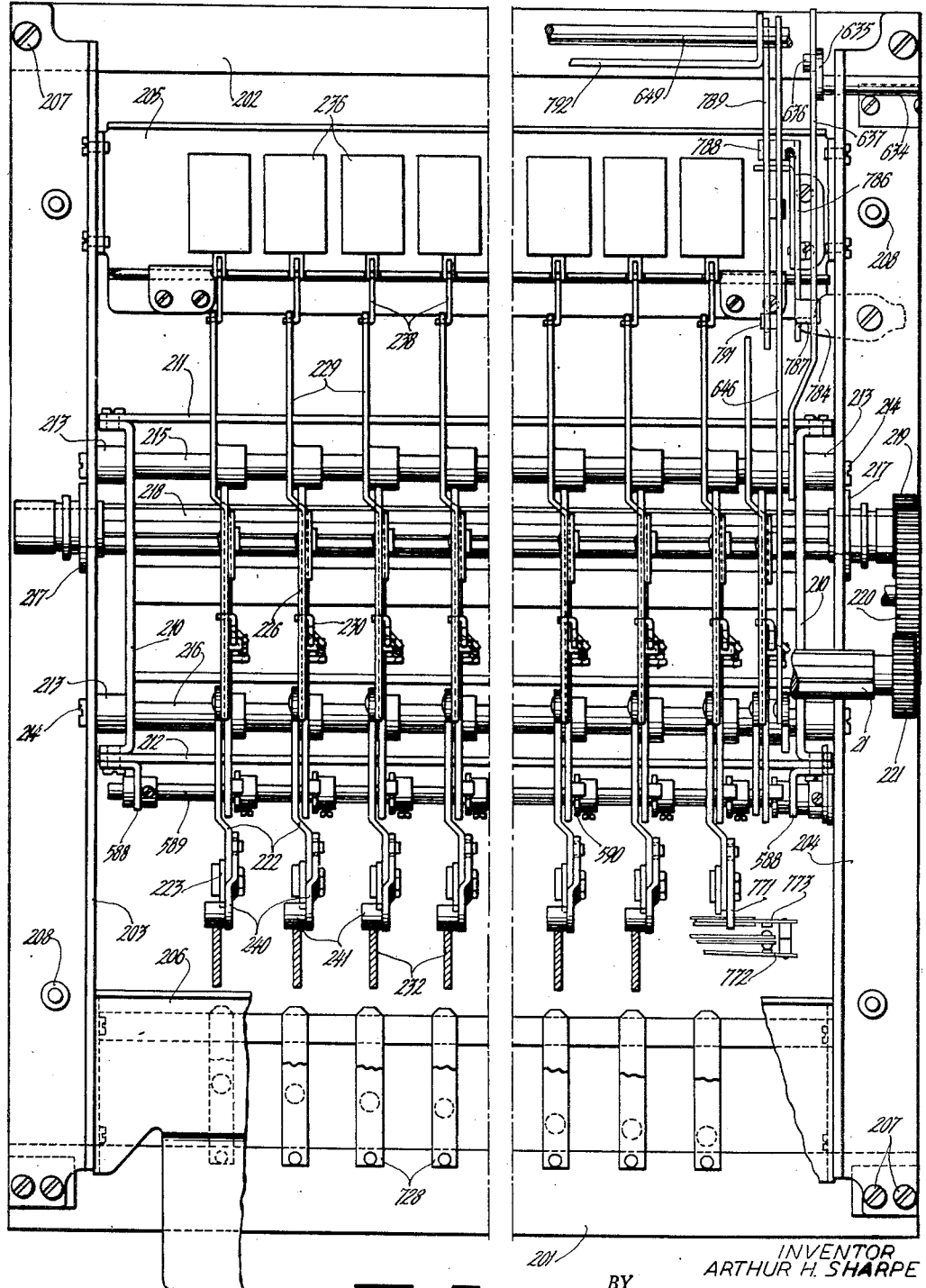
Figure 12:
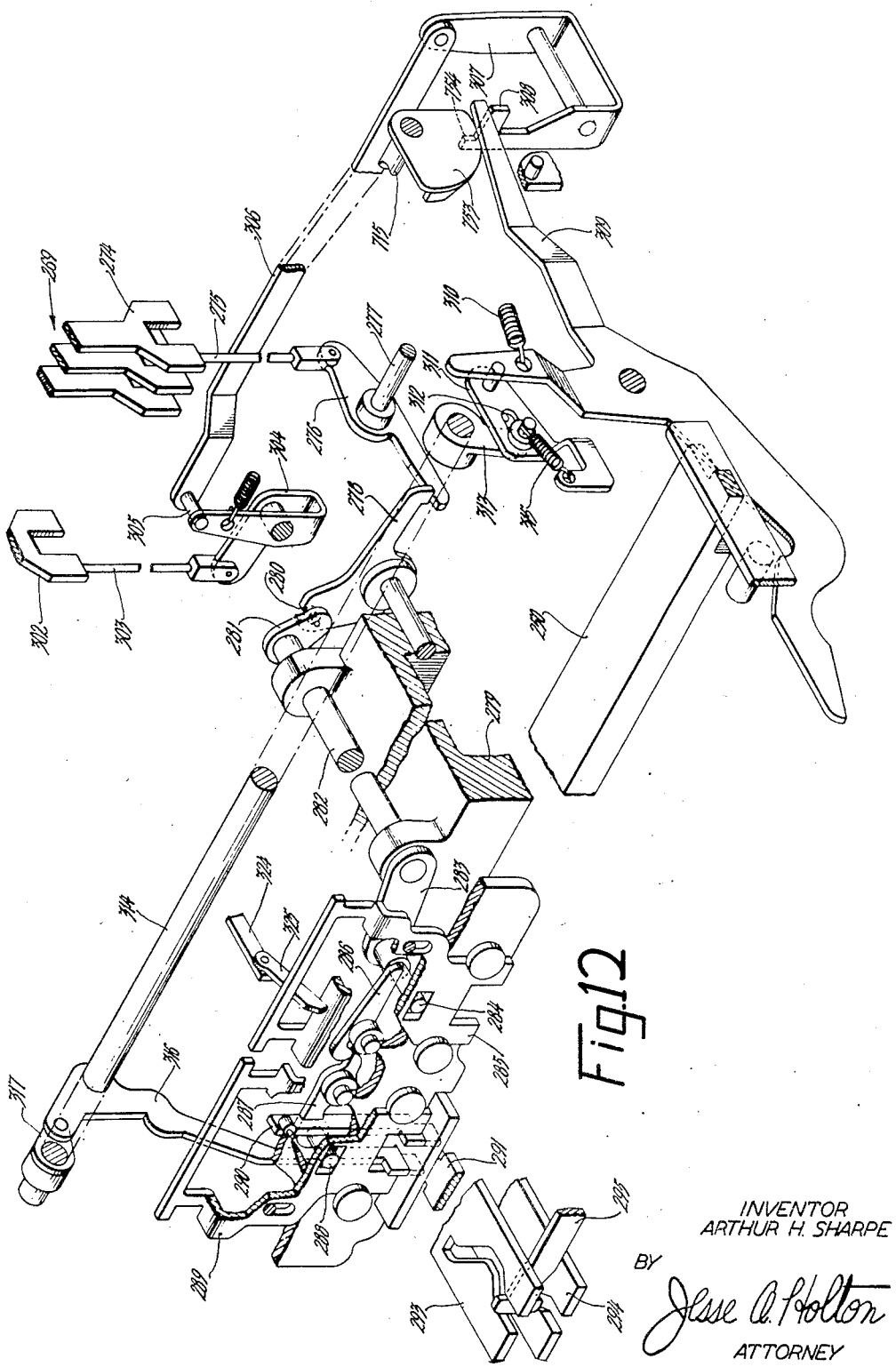
Figure 24:
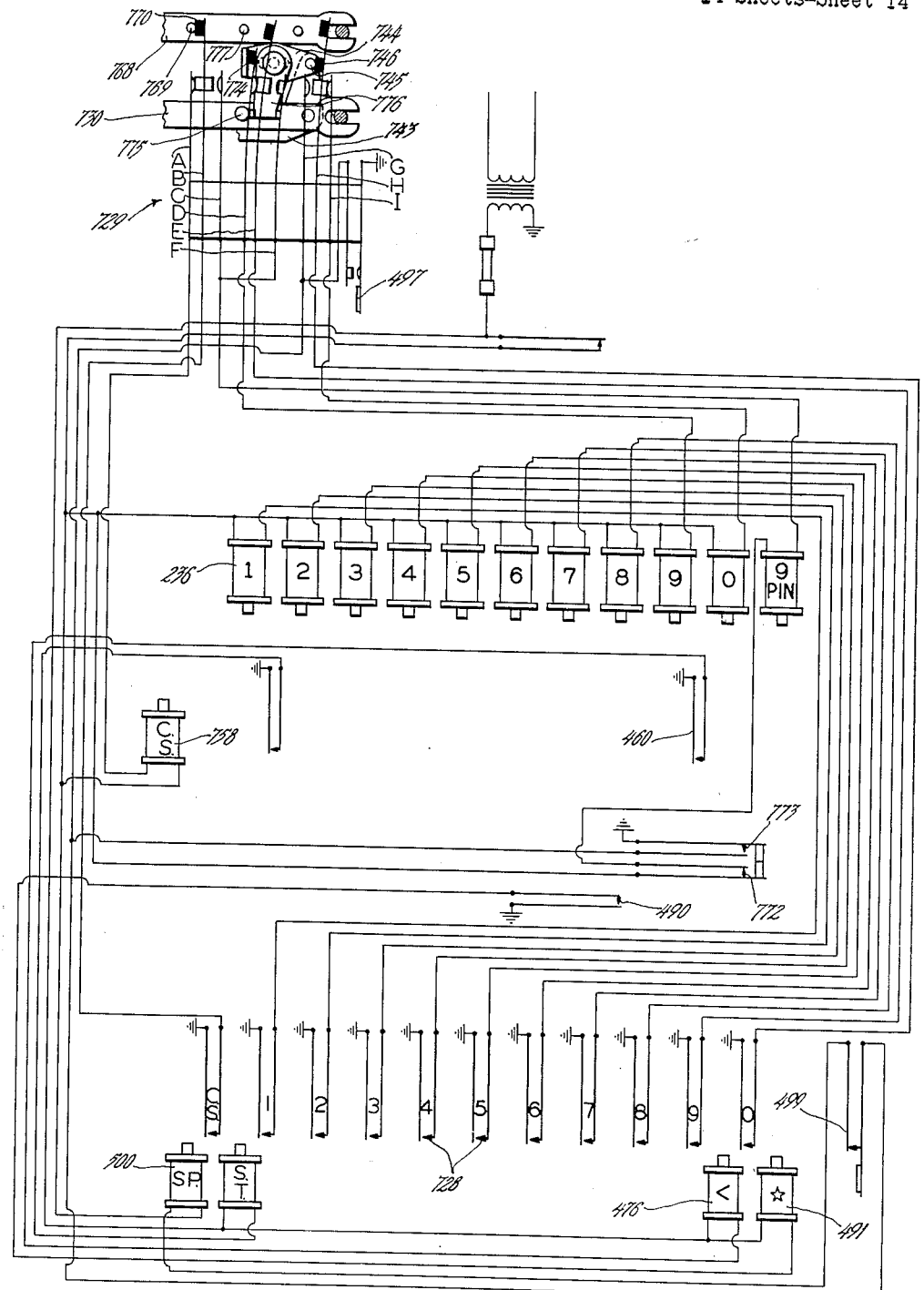

Referring now to the drawings:

Figures 1A and 1B, when placed together along the chain dotted break line, constitute a side elevational view, partly in section, of the whole machine, Figure 2 is a sectional view of a portion of one end of the typewriter carriage, showing the means for releasing the feed rolls, Figure 3 is a view taken from the opposite side of the machine, most of the parts being omitted in order to more clearly show the case shift mechanism and certain of the automatic controls, Figure 4 is a plan view of a portion of the escapement and escapement operating means, Figure 5 is a rear view of a portion of the machine and showing the power transmission, Figure 6 is a perspective view of the means for controlling the carriage speed during tabulation, Figure 7 is a plan view of a readily removable power transmitting section which is located between the typewriting section and the computing section of the machine, Figure 8 is an elevational view taken from the front of the machine with many parts omitted to show a dashpot arrangement for cushioning the carriage at the end of its return movement and showing also a portion of the automatic return mechanism, Figure 9 is a work sheet showing the type of work performed by the machine, Figure 10 is a diagrammatic showing of the means for driving the various parts of the machine from a single power source, Figure 11 is a perspective view of one of the registers and showing the "fugitive one" mechanism, Figure 12 is a perspective view showing a portion of the automatic means for selecting a register for additive or subtractive operations, Figure 13 is a side elevational view of a portion of the general operator mechanism, Figure 14 is a perspective view showing the means for moving a register into additive or subtractive position during a cycle of the general operator, Figure 15 is a fragmentary front view of a portion of the state-control means for the registers, Figure 16 is a rear perspective view of a portion of the cycling mechanism and showing a rebound checking device for the carriage, Figure 17 is a perspective view of a portion of the escapement mechanism and showing another means for operating said escapement, Figure 18 is a side elevational view with many parts omitted to show the Reverse Computing mechanism and showing also the operation of certain switches controlling various functions of the machine, Figure 19 is a side elevational view showing a switch which is operated by the Reverse Computing key to prevent an automatic spacing operation under certain conditions, Figure 20 is a side elevational view of a portion of the mechanism for instituting a Reverse Computing operation, Figure 21 is a perspective view showing a portion of the automatic total taking mechanism, Figure 21B is an enlarged view of a portion of the mechanism shown in Figure 21, Figure 22 is a perspective view of certain of the automatic function controlling elements and showing also certain parts of the total taking mechanism, Figure 23 is a plan view of a portion of the automatic controls, and Figure 24 is a wiring diagram.

Typewriting section generally

Referring now to Figures 1A and 1B, the typewriter or typewriting section of the present machine is substantially the machine known in the trade as the Underwood All-Electric Typewriter. It comprises the usual typewriter keyboard 10, there being in addition to the usual letter and numeral keys, a few extra keys to be later described for controlling certain bookkeeping functions. There is the usual row of numeral keys 11, only one being shown in the present drawing, and each numeral key is carried by a lever 12 mounted on a pivot wire 13 and is resiliently held in position by a spring 14 extending between an ear on said lever and a fixed cross member 15. A hook member 16 is carried by each lever 12 and the hooked portion of each member 16 overlies an ear 17 provided upon an actuator 18. The actuators are pivotally connected to hanging links 19 and are provided with toothed pawls 20 normally held out of engagement with a fluted shaft 21 by means of springs 22 extending between said actuators and a cross member 23. The fluted shaft 21 is rotated in a counterclockwise direction whenever the machine is in operation by means to be hereinafter described. Corresponding to each actuator 18, is a lever 24 pivotally mounted at 25 and connected by a pull link 26 to one end of a pivotally mounted type link 27.

Each of the numeral type links 27 is provided with a type head 28 having complementary digits for upper and lower case. The purpose of the complemental type will be described later. Upon operation of a numeral type key 11, the type carrying link 27 is swung about its pivot to cause the type head 28 to strike against a printing platen 29, as will readily be understood. These systems of links and levers by means of which the type heads 28 are selectively caused to strike the platen upon operation of the keys 10 and 11 are commonly referred to as "type actions" and are the mechanisms referred to hereinafter whenever the expression "type actions" is employed. Any suitable interlock 30 may be provided to prevent simultaneous operation of two or more numeral type actions.

The platen 29 may be rotated in a suitable manner for line spacing the work sheet which is carried thereby and is mounted in a carriage generally designated at 31. The details of construction of the carriage are not important for an understanding of the present invention, and it is sufficient to here point out that the carriage is comprised of a pair of end plates or members 32 and 33, see Figures 5 and 8, tied together by a number of tie bars 34, 35, 36 and 37, best seen in Figure 1B. The tie bar 34 is grooved along its two edges and it is fitted into a fixed trackway 38 extending transversely of the machine. Said trackway is provided with grooves corresponding to the grooves in the bar 34 and bearings 39, resting in the interfitting grooves, provide a smooth running mounting for the carriage. The tie bar 36 rests upon and travels along a roller 40 provided upon the framework of the typewriter and thus serves to support the rear portion of the carriage. The usual spring drum 41 constantly urges the carriage in letter feed direction in the usual manner and an escapement mechanism, generally designated at 42, permits the carriage to move in letter feed direction with a step-by-step motion whenever a type action or the usual space bar is operated.

Escapement

The escapement mechanism of the present machine is well known and is particularly described in Patent No. 2,362,229, issued November 7, 1944, in the name of Yaeger. In general, the escapement mechanism comprises a shaft 43 having fixed to its upper end a pinion 44 meshed with a rack 45 secured to the carriage tie bar 34 and having fixed to its lower end a pin wheel 46. As best seen in Figure 18 a holding dog 47 normally engages with the teeth of the pin wheel 46 and prevents said wheel from turning in a letter feed direction. The holding dog 47 is pivotally mounted upon a rocker member 48 which in turn is pivotally mounted in the machine framework at 49. A link 50 connects the upper end of the rocker 48 to one end of a link 51, the opposite end of which is pivotally connected to one end of a lever 52. The lever 52 is pivotally mounted intermediate its length at 53 and the opposite end of said lever is connected to an arm 54 extending rearwardly from a universal bar 55. As a type link 27 is swung up to printing position, a heel 56 located near its pivot point strikes against the universal bar 55, moving said bar to the rear end, through the connections described above, cause the rocker 48 to move in a counterclockwise direction, as viewed in Figure 18, sufficiently to disengage the holding dog 47 from the teeth of the pin wheel 46 and to move a second dog 57 carried by said rocker into the path of the tooth previously engaged by the dog 47. As the type link returns to its normal position the rocker 48, of course, resumes the position shown in the drawing with the holding dog 47 now in engagement with the next tooth of the pin wheel. Thus, whenever the rocker 48 is rocked in a counterclockwise direction the carriage is allowed to move one letter space to the left.

Typewriter carriage

Figure 2 shows a type of rear feed mechanism which may be used with the carriage, though it will of course be understood that the feeding mechanism may be either rear feed or front feed without effecting the present invention one way or another. In the particular feed shown, a pair of feed rollers 58 and 59 are mounted in arms 60 and 61 respectively, said arms being pivotally supported upon a common cross shaft 62. A shaft 63 extends across the rear of the carriage and is provided with flattend portions located between extensions of the arms 60 and 61. One or both ends of the shaft 63 may be bent up at 64 and pivotally connected to one end of a link 65, the opposite end of which is pivotally connected to the lower end of a feed roll release lever 66. The lever 66 is pivotally mounted on the carriage end plate 33 at 67 and is provided at its upper end with a finger piece 68 whereby, when the finger piece is moved to the left, as viewed in Figure 2, the shaft 63 will be rotated to thereby spread the ends of arms 60 and 61 and move the rollers 58 and 59 away from the platen, as is well known. Secured to each of the carriage end plates 32 and 33 is and upstanding member 69, and a paper support 70 is mounted upon a bar 71 extending between said upstanding members. Pivotally mounted upon each of said upstanding members 69 is a plate 72 carrying a pin 73 extending into an elongated slot 74 provided in feed roll release lever 66. The lower ends of the plates 72 are connected together by a tie bar 75. The tie bar 75 has secured thereby a member 76 upon which may be mounted a form holding finger 77 for slidable adjustment therealong. As seen in Figure 2 when the feed rolls are in engagement with the platen, the form holding finger 77 contacts the paper support 70. When the feed roll release lever 66 is rocked to release the feed rolls, the pin 73 causes the plates 72 to swing outwardly and lift the finger 77 from engagement with the paper support 70.

Decimal tabulation

Since the machine is to be used for printing amounts in columns on a work sheet, it is desirable to provide a decimal tabulating mechanism. The details of construction of the tabulating mechanism do not form a part of the present invention and it is sufficient to state that a row of decimal tabulator keys 78 is provided and that when a tabulator key is depressed, one or more of a series of combinational slides 79 is moved and through Bowden wires 80 and bell cranks, not shown, one or more of a series of combinational slides 81 is moved to allow a tabulator stop 82 corresponding to the depressed tabulator key to be raised by its spring 83, see Figures 1A and 1B. The carriage ends 32 and 33 are interconnected by a slotted rack 84 and a column stop 85 is positioned in said rack to define each of the work sheet columns. The raised tabulator stop 82 of course contacts the next in line column stop 85 as the carriage moves to the left in its tabulating movement to bring the carriage to rest in the desired denominational position within the column.

In order to release the carriage from the control of the escapement mechanism so that it will be free to move in tabulating direction, the lower end of each tabulator stop is provided with a nose 86. A bail member 87 is pivotally mounted upon a stationary rod 88 and has a portion 89 overlying the row of noses 86 and an arm 90 provided with a pin 91 resting upon one end of a rockable lever 92. The lever 92 is mounted upon a stationary pivot 93 and has a nose 94 lying closely adjacent an end of the escapement holding dog 47, see Figures 1B, 4 and 16. Thus, when a tabulator stop 85 is raised, its nose 86 rocks the bail member 87 which in turn moves the nose 94 against the end of the holding dog 47 and rocks said dog out of engagement with the pin wheel 46 to thereby release the escapement and permit free movement of the carriage. Suitable means is of course provided to retract the projected tabulator stop 85 after the carriage comes to rest, and a spring 95 connected to the holding dog 47 thereupon returns said dog to its position of engagement with the pin wheel 46.

The above description of the operation of the tabulator mechanism is sufficient for an understanding of the present invention but more details of the mechanism may be found by referring to Patent No. 2,384,060, issued September 4, 1945, in the name of H. C. Yaeger.

Carriage Return

The typewriter carriage is returnable by power to line starting position, and the same source of power is used for carriage return and for driving the type actions. An electric motor 96 is mounted in the framework of the typewriting section and has a drive shaft 97 to the end of which is fixed a drive pinion 98. As may be seen in Figures 5 and 6, the pinion 98 is meshed with a gear 99 fixed to a shaft 100 and to the opposite end of said shaft are fixed a pair of cogwheels 101 and 102. A chain 103, shown in outline in Figure 5, is driven by the cogwheel 102 to supply power to the general operator mechanism of the computing section, as will later be described. As shown diagrammatically in Figure 10, the cogwheel 101 drives, through a chain 104, a cogwheel 105 fixed to one end of the fluted drive shaft 21. Thus the shaft 21 is constantly driven whenever the motor is turned on.

As shown in Figures 5 and 6, a winding drum 106 is loosely mounted on the shaft 100 and has fixed thereto one end of a draw band or tape 107. The tape 107 passes upward from the drum 106, over a pair of fixed sheaves 108 and 109, and its other end is connected to a drum 110 secured to a line spacing shaft 111. The operation of the line spacing mechanism does not form a part of this invention and therefore has not been shown. However, it is well known and is shown in a number of patents, including the above referred to Yaeger Patent No. 2,362,229.

A driving clutch element 112 is fixed to the shaft 100 and a driven clutch element 113 is keyed to a gear 114 which in turn is fixed to the winding drum 106. Means is provided, as will be described, for shifting the clutch element 113 into driving engagement with the clutch element 112, as a consequence of which the drum 106 will be driven in a direction to wind up the tape 107. When the drum 106 begins its winding up rotation, the tape 107 first turns the drum 110 in a counterclockwise direction far enough to affect a line space movement of the platen, and after that the tape pulls the carriage in return direction until an adjustable margin stop 115 mounted on the carriage tie bar 35 strikes the upper end of a counter-stop 116, see Figure 8. As the counter-stop 116 is struck in carriage return direction, the clutch 112—113 is opened, as will later be described, to stop the winding up movement of the drum 106.

To take up the shock incident to stopping the carriage, the following arrangement has been made. Referring to Figure 8, the lower end of the counter-stop 116 is mounted on a pin 117 which is movable up and down but not sideways and the upper end thereof extends through an elongated opening 118 in a cover plate 119. The opening 118 is wide enough to permit the carriage to move approximately two letter spaces to the right as viewed in Figure 8 after the margin stop 115 strikes the counter-stop. A slide 120 is mounted inside the cover plate 119 by means of a pair of headed pins 121 fixed in the cover plate and extending through elongated openings in said slide, and is provided with an ear 122 bearing against the edge of the counter-stop. The slide 120 is provided with a pin 123 extending through an elongated opening 124 in the cover plate 119 and fitted into an opening in a member 125. The member 125 is pivotally mounted at 127 upon the cover plate 119 and is provided at one end with a nose 128 bearing against one end of a rod 129 fixed at its opposite end to a piston 130 of a dash pot 131. Thus, when the upper end of the counter-stop 116 moves to the left, the pin 123 rocks the member 125 in a counterclockwise direction, thereby driving the piston 130 into the cylinder of the dash pot.

In order that the holding dog 47 of the escapement may be released to allow the carriage to drift back the approximately two letter spaces which it has overtraveled, the member 125 is provided with an arm 132 resting against a cam-shaped nose 133 of a pivotally mounted lever 134, as best seen in Figure 17. The lower end of the lever 134 rests against a slide 135 which is provided with an ear 136 resting closely adjacent the end of the holding dog 47. As the member 125 rocks in its counterclockwise direction, the arm 132 thereof cams the lever 134 in a clockwise direction, as viewed in Figure 17, to thereby cause the ear 136 of the slide 135 to move the dog 47 out of engagement with the teeth of the escapement pin wheel 46. As the carriage returns its overtraveled distance, the arm 132 moves back to its Figure 8 position to thereby allow the dog 47 to reengage the escapement.

The above mentioned automatic carriage return is instituted by an adjustable margin stop 137, see Figure 8, striking the counter-stop 116 as the carriage moves in letter feed direction. When the stop 37 contacts the counter-stop 116 it of course moves the upper end thereof toward the left, as viewed in Figure 8, whereupon a pin 138 on said counter-stop pushes against the upper end of a two-armed lever 139 pivotally mounted upon the pin 117. The other arm of said lever is pivotally connected at 140 to a slide 141 having an ear 142 thereon. As the lever 139 is rocked in a counterclockwise direction, the slide 141 is raised and the ear 142 thereon pushes up on an ear 143 of a latch member 144 pivotally mounted on the framework of the machine and moves said latch member in a direction to withdraw a nose 145 thereof from engagement with the end of a link 146. The link 146 has pivotally connected thereto a link 147 which is pivotally connected to an arm 148 fixed to a clutch shipper shaft 149. A relatively heavy spring 150 is connected to one end of the arm 148 and when the nose 145 is withdrawn from the path of the link 146, the spring 150, through the arm 148 and link 147, swings said link 146 upwardly, as viewed in Figure 8, about a pivot not shown. Also fixed to the shaft 149 is a yoke 151 engaged in a groove 152 provided in the clutch member 113, and as the spring 150 moves the arm 148 it rotates the shaft 149, and the yoke 150 thereupon moves the clutch element 113 into engagement with the clutch element 112 to thereby cause the winding drum 106 to be driven in a winding-up direction, as aforesaid.

After the carriage has been driven in its return direction to the point where the margin stop 115 strikes the counter-stop 116, said counter-stop in its then rightward movement bears against the upper end, not shown, of the link 146 and moves said link in a downward direction, as viewed in Figure 8, to the point where the nose 145 of the latch member 144 again latches over the upper edge of said link. As the link 146 moves down, the link 147 of course rocks the arm 148 in a counterclockwise direction to cause the yoke 151 to move the clutch element 113 out of engagement with the clutch element 112. The above described means for opening and closing the clutch 112—113 is not novel and more of the details thereof are shown in the co-pending application of A. H. Sharpe, Serial No. 34,763, filed June 23, 1948.

Carriage speed control

In order to prevent the carriage from going too fast in its tabulating movements, particularly for long tabulating runs, means has been provided to regulate the speed of tabulation by the motor. Referring now to Figures 5 and 6 and particularly Figure 6, it will be seen that the gear 114, and consequently the drum 106, is associated with the gear 99 through a train which bypasses the clutch 112—113. The by-pass train comprises a gear 153 loose on a shaft 154 and meshed with the gear 114, gear 155 fixed to said shaft, a pinion 156 drivingly connecting the gear 155 to a gear 157 fixed to turn with the gear 99, and a free-wheeling clutch 158—159 between the gears 153 and 155. The clutch element 158 is fixed to the gear 153 and the clutch element 159 is fixed to the shaft 154. The direction of drive from the motor shaft 97 to the clutch element 159 is indicated by arrows, and it will be apparent that the clutch element 159 turns freely in the direction of the arrow without affecting the clutch element 153 or the winding drum 106. When the clutch 112—113 is engaged to wind up the tape 107 on the drum 106, the clutch element 158 fixed to the gear 153 may turn freely in the direction opposite to the clutch 159. However, during tabulating movement of the carriage, the tape 107 unwinds from the drum 106, and the gear 153 and its clutch element 158 turn in the same direction as the clutch element 159, but due to the one-way or free-wheeling construction of the clutch 158—159, the gear 153 can turn no faster than the gear 155 is turned by the motor. Thus the speed of the motor controls the tabulating speed of the carriage.

Since, as previously noted, the first result of a pull on the draw band 107 will normally be a line spacing operation of the platen, and since it is obviously not desirable to line space every time the carriage is tabulated, and since, as described above, the draw band 107 is employed in controlling the carriage speed, means must be provided to prevent this normal line spacing operation during tabulating operations. As shown in Figures 1B and 5 the upper end of the lever 92 rests upon an ear 160 provided on a bail member 161 pivotally mounted upon the aforementioned rod 88. A push link 162 is pivotally connected to the bail member 161 and the upper end of said push link 162 is bent over and rests beneath the flanged lower edge of a member 163. The member 163 is fixed at its ends in any suitable manner to a pair of arms 164, only one of which is shown, said arms being pivotally connected to the carriage end plates 33. As seen in Figure 5, the member 163 has a pin-and-slot connection 165 with one arm of a pivotally mounted lever 166. The drum 110 has fixed thereto a member 167 having an ear 168 which travels in a path normally unobstructed by an end 169 of the lever 166. As previously mentioned the lever 92 rocks in a clockwise direction to institute a tabulating movement of the carriage and it will be appreciated that with the arrangement just described, whenever the lever 92 is rocked clockwise the member 163 is raised and thereby rocks the lever 166 so that the end 169 thereof moves into the path of the ear 168 so that a speed-controlling tension in the draw band 107 will not result in a line spacing operation.

Case shift mechanism

The case shift mechanism of the typewriting section of the machine is the same as that employed in the Underwood All-Electric Typewriter and is described in detail in Patent No. 2,275,759, issued March 10, 1942, in the name of W. F. Helmond. In general, it may be pointed out that the type links 27 are mounted in a case-shiftable segment or basket 170 as shown in Figures 1A and 13. The segment 170 is pivotally and slidably mounted for case-shifting movement downward from the Figure 1A position. As shown in Figure 3, a spindle 171 fixed to said segment is fitted between a pair of headed screws 172 carried by a shiftable yoke member 173. The yoke member is pivotally mounted at 174 on the main frame of the typewriter and is pivotally connected at 175 to a strap 176 mounted by means of ball bearings on a rotatable eccentric 177. The main drive shaft 21 is provided with a section of reduced cross-sectional area which extends loosely through the eccentric 177, and a toothed member 178 is secured to said main drive shaft adjacent said eccentric. A clutch pawl 179 is pivotally mounted upon the eccentric 177 and has an ear 180 normally engaged by a dog 181 pivotally mounted upon the machine framework.

As may be seen in Figure 3, the dog 181 holds the nose of the pawl 179 out of engagement with the rotating toothed member 178. A link 182 interconnects one end of the dog 181 with the end of a second pivotally mounted dog 183 having a nose 184. A link 185 connects the dog 181 to an arm 186 fixed to a rockshaft 187. By manual means, not shown, the shaft 187 may be rocked in a clockwise direction to withdraw the dog 181 from engagement with the ear 180 of the pawl 179. Suitable spring means, not shown, thereupon moves the nose of the pawl 179 into engagement with the rotating toothed member 178 and the eccentric is then rotated in a clockwise direction until the ear 180 catches upon the nose 184 of the dog 183, which, as will be readily appreciated, is rocked in a clockwise direction whenever the dog 181 is rocked, due to the connecting link 182. Of course, when the eccentric 177 is rotated to its new position the strap 176 moves downward from its Figure 3 position to thereby rock the yoke 173 and move the segment or basket 179 downward to its upper case position. Means, to be presently described, is provided for rocking the dogs 181 and 183 to provide for automatic case-shift operations under certain circumstances.

Intermediate power section

The computing section of the machine comprises a pair of castings or side plates, one of which is indicated in Figure 3 at 200. The side plates are tied together by a number of transversely extending members, two of which are indicated in Figures 1A, 1B and 3 at 201 and 202. The members 201 and 202 carry what may be termed an intermediate power section, a plan view of which is shown in Figure 7. This intermediate section is the subject of a co-pending application, Serial No. 200,574, filed December 13, 1950, in the name of A. H. Sharpe, and in combination with other elements constitutes one of the important features of the present invention.

Referring now particularly to Figure 7, the intermediate section comprises a pair of longitudinally extending angle bars 203 and 204 tied together near their rear ends by a plate 205 and near their forward ends by a plate 206. The intermediate section is secured to the computing section by means of only six screws 207 which secure the angle bars 203 and 204 to the tie bars 201 and 202. Four pins 208 project upwardly from the angle bars 203 and 204, and hollow feet 209, two of which are shown in Figure 3, support the typewriting section in position upon the intermediate section. Thus, it will be seen that the three main sections of the machine consisting of the typewriting section, the intermediate section and the computing section may be manufactured as separate units and readily assembled, and likewise the three sections may be disassociated from one another readily to permit the various mechanisms comprised within each section to be easily reached for adjustment or repair.

Brackets 210 are secured together by a pair of plates 211 and 212 and each bracket has secured thereto by swagging or otherwise a pair of spacer collars 213 into which are screwed bolts 214 extending through the upstanding sides of the angle irons 203 and 204. A pair of pivot shafts 215 and 216 are non-rotatably fixed between the brackets 210 for a purpose to be presently described.

Mounted for rotation in bearings 217 provided in the angle bars 203 and 204, is a fluted drive shaft 218. As shown in Figure 7, the drive shaft 218 is provided at one end with a gear 219, and when the complete machine is assembled, the gear 219 meshes with a pinion 220 mounted in a side plate of the typewriting section, which pinion 220 meshes in turn with a gear 221 provided upon one end of the fluted shaft 21 so that the power for driving the shaft 218 is supplied by the same motor 96 which drives the power shaft of the typewriting section.

A plurality of bell cranks 222, shown in Figures 1A and 7, are pivotally mounted upon the pivot shaft 216 and each bell crank is provided with a pendant 223 for a purpose to be presently described. A light spring 224 extends between a pin provided on each bell crank and an anchor plate 225 mounted in any suitable manner between the brackets 210 to normally hold the bell cranks in the position shown in Figure 1A. An actuator 226 is pivotally connected to the upper arm of each bell crank 222. As shown in Figures 1A and 1B, these actuators 226 are similar to the actuators 18 and are each provided with a toothed pawl 227 which is normally held out of engagement with the fluted shaft 218 by means of a spring 228 extending between the actuator and a suitable anchor plate.

Associated with each actuator 226 is a linkage comprising an elongated member 229 pivotally mounted upon the pivot shaft 215 and provided with a hook member 230, the hooked end of which normally overlies an ear provided on the actuator 226. This association of the elongated member 229, hook member 230 and the actuator 226 is similar to the association between the lever 12, hook member 16 and actuator 18 of the typewriting section. With this arrangement it will be apparent that whenever one of the elongated members 229 is rocked in a counterclockwise direction as viewed in Figures 1A and 1B, the hook member 230 will pull down on the actuator 226 to engage the toothed pawl 227 thereof with the rotating fluted shaft 218 which will thereupon drive said actuator toward the left and rock the bell crank 222 in a counterclockwise direction to thereby drive the pendant 223 downward.

Pivotally mounted upon a transverse shaft 231 supported in the framework of the typewriting section are a plurality of members 232, there being a member 232 corresponding to each of the type levers 12. Each member 232 is provided with an ear 233 overlying the upper edge of its type lever 12 and with a pin 234 underlying the lower edge of said type lever. A tab 235 provided on one arm of each member 232 rests upon the left hand end of one of the elongated members 229 whereby, whenever a numeral key is depressed, a corresponding elongated lever 229 will be rocked in a counterclockwise direction to move its associated pendant 223 downward, as aforesaid. As shown in Figures 1B and 7, a row of solenoids 236 is mounted upon the tie plate 205 of the intermediate power section. Upon energization of a solenoid 236, in a manner to be presently described, its armature 237 moves inwardly to rock a bell crank 238 in a clockwise direction and cause an ear 239 on said bell crank to lift up on the right hand end of the associated lever 229 to thereby move the pendant 223 downwardly as aforesaid. An arm 240, best seen in Figure 1A, is provided on each bell crank 222 and carries a roller 241 arranged to wipe against a face 242 of an associated member 232 when said bell crank is rocked. Thus, upon energization of one of the solenoids 236 and the consequent rocking of the associated bell crank 222, the member 232 is rocked in a clockwise direction to thereupon pull down on a type lever 12 and cause the printing of a digit, as will be readily understood.

*Computing section generally*

As is the arrangement in the well known Underwood Standard Accounting Machine, the present machine is equipped with a plurality of add-subtract registers extending in a line across the forward portion of the machine. The registers are located in the computing section C, and designated generally in Figure 1A at 243. One of the registers is more fully shown in Figure 11 and will be hereinafter described in some detail. In general, however, each of the registers comprises a plurality of axially-aligned composite wheels 244 including a pinion 245 and a disk 246 having a spiral arrangement of digits stops. A group of idler gears 247 corresponding to the wheels of the registers are located directly behind the register wheels and are meshed with the teeth of differential actuator racks or members 248. The differential actuators 248 are each provided with a row of indexable pins 249, there being for each actuator a pin 249 representing each of the digits from 0 to 9. The pins 249 are moved from their upwardly extending positions shown for nine of said pins in Figure 1A to project below the differential actuators in accordance with the digits typed, as will presently be more fully described.

As is characteristic of this type of machine, after a number has been printed and the differential actuators 248 have been been indexed accordingly, the machine is caused to automatically perform a cycle of operation, during which time a general operator bar 250, shown in Figure 1B, moves forward and picks up the differential actuators 248 in which the pins 249 have been indexed, and moves said actuators forward differential amounts depending upon the amount which has been indexed. At the beginning of the cycle of the general operator bar 250, the register or registers which have been automatically selected, as will later be described, are moved downward so that their wheels 244 engage directly with the teeth of the racks 248 when addition is to be performed, or more rearwardly into engagement with the idler gears 247 when subtraction is to be performed. After the forward movement of the differential actuators 248 has been compelted, the registers are restored to their normal Figure 1A position before said actuators are restored. During the second half of the cycle, the differential actuator bar 250 engages a lug 251 provided upon each of the differential actuators, to thereby restore said actuators to their normal position.

As described and claimed in the co-pending application No. 196,450, filed November 18, 1950, in the name of A. H. Sharpe, the automatic controls for the various machine functions are attached to or supported by the computing section. As seen in Figure 1B, a control tower generally designated at 252 is supported at its lower rear end upon a bracket 253 mounted upon a post 254 secured to a tie bar 255 extending between the main side plates 200 of the computing section. The forward lower end of the control tower 252 is carried by a bracket 188, shown in Figure 3, which rests upon the hereinafter mentioned member 202. A bracket 256, one of which is shown in Figure 1B, is secured to each of the main side plates 200 of the computing section, and a rail 257 is supported by said brackets 256. An angle member 258 provided with pairs of rollers 259 is carried by the bracket 188.

A programming unit generally designated 266 comprising a notched front rail 260, a tie bar 261 and a plurality of column units 262 is carried by the angle member 258 and the rail 257 in the manner shown in Figure 1B. As is well known, the column units 262 may be positioned wherever desired along the members 260 and 261, and there will be a column unit 262 for each computing column of the work sheet. A pair of ears 263, only one of which is shown, extend upwardly from the ends of the programming unit and are engaged by a pair of spring urged latch members 264, again only one of which is shown, provided upon the carriage tie bar 37. As the typewriter carriage 31 moves back and forth in its tabulating and return movements the latches 264 and ears 263 serve to move the programming unit and its column units 262 along with it, rollers 265 provided on the column units riding along the rail 257 and the notched front rail 260 running between the rollers 259.

When an amount is to be entered in a column, the operator depresses the proper tabulator key 78 to cause the carriage to tabulate to the decimal position wherein the highest order digit of the number is to be printed. When the typewriter carriage comes to rest, the column unit 262 comes to rest in a position over a series of function selecting cam plates generally designated in Figure 1B at 267. The column unit will be provided with lugs or dogs for selecting certain registers for addition or subtraction, depending of course upon the arrangement of the work sheet form. The cam plates 267 are slidably mounted in the control tower 252 and the lower edge of each plate rests upon a lug 268 provided upon one of a series of slides generally designated 269. The slides 269 are mounted for vertical movement within the control tower in a pair of guide combs 270 and the lower edge of each slide 269 rests upon a rod 271, as may be seen in Figure 1B. In Figure 1B the column unit 262 is shown equipped with dogs 272 for selecting the registers A–1 and B–1 for performing addition and with a dog 273 for selecting a star printing mechanism, as will be presently described. This selection of functions is the selection automatically made in the Debit column of the work sheet shown in Figure 9.

*Register selection*

Referring now more particularly to Figure 12, the slide 269 operated by the blade 267 which is depressed by the forwardmost dog 272 is indicated at 274. The slide 274 rests upon a push rod 275 which in turn is pivotally connected to one end of a two-armed lever 276 pivoted upon a shaft 277. The opposite end of the lever 276 underlies an end of a lever 278 pivotally mounted upon a heavy cross plate or tie bar 279 constituting a part of the main framework of the computing section and at its oppiste end the lever 278 is connected through a pin-and-slot connection 280 to a crank arm 281 fixed to a rock shaft 282. A crank arm 283 is fixed to the opposite end of the shaft 282 and is provided with a pin 284 extending into an opening in a slidably mounted coupler lifter member 285 and said pin also underlies one arm of a pivotally mounted lever 286, the other arm of which underlies one arm of a pivotally mounted lever 287. The opposite end of the lever 287 is provided with a pin 288 extending into a slot provided in a slidably mounted coupler lifter member 289 and said arm also fits within a notch provided in a latch member 290. With this arrangement it will be apparent that when the forwardmost dog 272 depresses its associated control plate 267 the plate 274 shown in Figure 12 will be depressed, and through the chain of levers and shafts above described will cause the two coupler lifter members 285 and 289 to be raised, and will cause the lower end of the latch member 290 to be withdrawn from engagement with a notch provided in a state-control slide 291.

As shown in Figure 1A the state-control slide 291 is urged toward the front of the machine by a spring 292 and is provided at its forward end with a pair of cam slotted plates 293 and 294. A cam follower 295 normally has head portion 296 positioned within the cam slot of the uppermost plate 293 and is pivotally mounted upon an arm 297 of a slidably mounted member 298, as best shown in Figure 15. The member 298 is keyed at 299 to a bail member 300 slidably mounted upon and keyed to a rockshaft 301. When the latch member 290 is withdrawn from the state-control slide 291, the spring 292 moves said slide forwardly to a position wherein the cam slot of plate 293 causes the bail member 300, through the follower 295 and slide 298, to move to the right, as viewed in Figures 14 and 15. As will later become apparent this right hand position of the bail member 300 is the addition determining position. As is well known, there is a state-control slide 291 for each register and a control plate 267 for each state-control slide.

In columns wherein the machine is to normally perform a subtractive operation, a dog will of course be provided upon the column unit 262 for that column for cooperating with the appropriate control plate 267 for conditioning the selected registers for subtractive operation. Referring again to Figure 12, the slide 269 which rests beneath the subtraction controlling plate 267 is designated by reference numeral 302 and the rod upon which said slide rests is indicated at 303. The rod 303 is pivotally connected to one arm of a bail member 304, the other arm of which is pivotally connected by means of a pin 305 to one end of a pull link 306, the opposite end of which is connected to one arm of a bail member 307. The other arm of the bail member 307 is provided with a nose 308 underlying one arm of a pivotally mounted three-armed lever 309, said lever 309 being urged in a clockwise direction by a spring 310. One arm of the lever 309 is connected to one end of a member 311 provided with a slot 312 through which extends a pin carried by an arm 313 fixed to a rockshaft 314, and a light spring 315 connects one end of the member 311 to the pin on the arm 313. A plurality of latch members 316, only one of which is shown, are carried by arms 317 fixed to the rockshaft 314 and the lower end of each latch member 316 extends into a notch provided in one of the state-control slides 291. It will be apparent that when the slide 302 is depressed, the system of links, levers and shafts herein referred to will cause the lower end of each of the latches 316 to be withdrawn from engagement with the state-control slides 291. Upon the withdrawal of the latches 316, any of the state-control slides 291 from which the latch 290 has been withdrawn will move forward an additional distance and in this additional forward movement the cam slotted member 293 will draw the follower 295 and consequently the bail member 300 toward the left to a subtraction determining position. The above described mechanism for automatically selecting a register for addition or subtraction is more fully described in the co-pending application, Serial No. 49,345, filed September 15, 1948, in the name of A. H. Sharpe.

*Indexing*

Slidably mounted for vertical movement within the control tower 252 are a plurality of denominational jacks 318, the upper ends of which normally extend into the path of movement of a tappet 319 provided upon each of the column units 262. As the carriage steps through a computing zone or column, the tappet 319 depresses the denominational jacks 318 one at a time. The lower end of each denominational jack 318 rests upon one of a group of push links 320, each link 320 being in turn pivotally connected to one arm of a bell crank 321, as shown in Figure 1B. As fully described in the above referred to Patent No. 2,405,268 to R. W. Pitman, the lower arm of each of the bell cranks 321 rests against the end of one of a series of master racks 322. Each rack 322 is articulated to a rockable blade 323. The blades 323 extend substantially across the width of the machine and to said blades are articulated sets of distributive racks 324, there being a set of racks 324 corresponding to each set of differential actuators 248. A coupler 325 is pivotally connected to the forward end of each of the racks 324 and said couplers rest upon coupler lifter members 285 and 289 hereinabove referred to, as shown in Figures 1B and 12. As is well known, and as is explained in the said R. W. Pitman patent, whenever a denominational jack 318 is depressed, a rack 324 for each of the registers is moved slightly forward, the arrangement being such that when the right hand jack 318 as viewed from the front of the machine is operated the left hand racks 324 move forward, whereby when the highest order digit of a number is typed the highest order racks 324 have been moved forward.

As previously mentioned, whenever a register or registers are selected, the coupler lifter members 285 and 289 for the selecting registers are raised, and consequently it will be apparent that the couplers 325 corresponding to the selecting register or registers will be raised to a position wherein their forward ends rest behind the lugs 251 of the differential actuators 248. Supposing for the moment that one register is to be selected for a particular column and the carriage is tabulated to the hundreds of dollars position within the column, then as the carriage comes to rest in the hundreds of dollars position, the tappet 319 depresses the hundreds of dollars denominational jack 318 which in turn, through the linkages above described, moves the hundreds of dollars actuator 248 forward far enough to position its indexed pins 249 beneath a group of transversely extending blades 326. The blades 326, together with other elements mounted within a framework generally designated at 327 in Figure 1A, constitute an indexing means. The blades 326 are articulated in a suitable manner, as for example by bell cranks, to other blades 328 and each of the blades 328 is connected through a crank arm 329 to a rockshaft 330, there being a rockshaft 330 corresponding to each of the digits from 0 to 9.

Connected to one end of each of the rockshafts 330 is a crank arm 331, the free end of which is in cooperative engagement with the lower end of one of the pendants 223, referred to above. When a digit is typed by operation of one of the numeral keys 11, the member 232 is rocked clockwise, as aforesaid, to thereby rock the elongated member 229 counterclockwise and move the actuator 226 into engagement with the fluted shaft 218, whereupon the actuator is driven towards the left as viewed in Figure 1A, to rock the bell crank 222 in a counterclockwise direction and drive the pendant 223 downward. This downward movement of the pendant 223 rocks the associated shaft 330 and, through its arm 329 and blade 328, moves the blade 326 downward, to thereby depress the pin 249 located beneath said blade 326, the appropriate denominational order actuator rack 248 having been moved forward to pin setting position, as above described. The printing of the digit of course operates the escapement mechanism, and the typewriter carriage 31 thereupon steps to the next lower denominational order position, at the same time moving the programming unit 266 along with it. In this new denominational position, the tappet 319 depresses the next in line denominational jack 318 and moves the next lower order actuator rack 248 slightly forward as will be readily understood. As the tappet 319 leaves a denominational jack 318, a spring device 332 shown in Figure 1B restores the differential actuator 248 to the position shown in Figures 1A and 1B, wherein its pin 249 are out of operative alignment with the blades 326. This process of printing and indexing continues until the carriage reaches the decimal point position.

*Decimal point skip*

With the present machine a decimal point is not printed, but a space is provided between the units of dollars and the tens of cents positions. Referring now to Figures 3 and 23, it will be seen that a jack 333 is provided in a position to be depressed by the tappet 319 as the carriage reaches the decimal point position. The jack 333 is not associated with any of the differential actuators 248 but instead, as shown in Figure 3, is provided with a notch into which extends a pin 334 provided upon one arm of a member 335. The member 335 is pivotally mounted upon a suitable stationary bracket and is urged in a counterclockwise direction, as viewed in Figure 3, by a spring 336, whereby the jack 333 is normally held in an upward position. One edge of the member 335 bears against a stud 337 provided upon one end of the hereinbefore referred to slide 135. As the jack 333 is depressed, the member 335 rocks in a counterclockwise direction and through the engagement of its edge with the stud 337 moves the slide 135 in the direction to cause its ear 136 to move the escapement dog 47 out of engagement with the pin wheel 46, and thereby permit the carriage to move to the next letter space position. As the tappet 319 leaves the jack 333, a spring 338 restores the slide 135, thereby permitting the escapement to once more resume control of the carriage. After the carriage skips over the decimal point position, the operator then types the tens of cents and units of cents, and these digits are indexed in the differential actuators 248 in the same manner as described above.

*Running indexed amount into a register*

As the lowest order digit of an amount is typed and indexed, the carriage of course escapes in the usual manner to the next letter space position, and during the movement of the carriage to this next letter space position, a tab 339 provided upon each column unit 262 passes over a cycle tripping dog 340, shown in Figures 1B and 16. The dog 340 is pivotally mounted upon the control tower 252 and carries a pin 341 which engages a step provided on a jack 342. As shown in Figures 16, the lower end of the jack 342 rests upon the upper end of a push link 343, similar to the push links 320, pivotally connected at its lower end to one arm of a bell crank 344, the other arm of which bears against an ear provided upon the end of one arm 345 of a bail member 346. Bail member 346 has a second arm 347 overlying a pin provided upon the end of an arm 348 fixed to a cycle tripping shaft 49. Also fixed to the shaft 349 is a hook member 350 which, as best seen in Figure 18, hooks over a square stud 351 provided upon a disk 352 loose on the main cycle shaft 353 of the machine.

As shown in Figure 5, and shown diagrammatically in Figure 10, the hereinbefore referred to drive chain 103 drives a sprocket 354 fixed to a jack shaft 355 to which shaft is also fixed a pinion 356. The pinion 356 meshes with a gear 357 loosely mounted for rotation upon the main cycle shaft 353. A ratchet wheel 358 is fixed to the gear 357 and the ratchet 358 is constantly driven by the motor 96. A pawl carrying disk 359 upon which is pivotally mounted a plurality of driving pawls 360 is fixed to the shaft 353. Pins 361, one of which is shown in Figure 18, are fixed to the disk 352 and normally engage the pawls 360 in such manner as to hold said pawls out of engagement with the ratchet 358. A spring 362, shown in Figure 16, extends between a pin provided upon the stud 351 and a pin provided upon the disk 359 and urges the disk 352 in a clockwise direction about the shaft 353.

It will be apparent that when the tab 339 passes over the cycle trip lever 340, the hook member 350 is withdrawn from engagement with the square stud 351. The spring 362 thereupon rotates the disk 352 sufficiently to move the pins 361 toward the pivot points of the pawls 360 and allow said pawls to be moved by suitable spring means into engagement with the teeth of the ratchet 358. The ratchet 358 then drives the disk 359, and consequently the shaft 353, through one revolution, whereupon the stud 351 again catches beneath the hook 350, thereby disengaging the pawls 360 from the pinion 358 and interrupting the drive of the shaft 358, as will be readily understood.

Referring now particularly to Figure 13, it will be seen that the shaft 353 has fixed thereto a crank arm 363 which carries a roller 364 engaged within a slot 365 provided in a member 366 fixed to a rack 367. During a rotation of the shaft 353, the rack 367 is driven forwardly from the position shown in Figure 13 during the first half of the revolution of said shaft and during the second half revolution is restored to its normal position. A pinion 368 is meshed with the teeth of the rack 367 and also with the teeth of a segment 369 fixed to a cross shaft 370. A member 371 is also fixed to said shaft 370 and upon one arm of said member is pivotally mounted a pawl 372, a nose of which is urged into engagement with a pin 373 of a cam slotted member 374 by means of a spring 375. The cam slotted member 374 is pivotally mounted upon a stationary square block, as shown in Figure 13, which serves also to guide one end of an arm 376, the opposite end of which is pivotally connected to an arm 377 fixed to the hereinbefore referred to rockshaft 301. A pin 378 fixed to the arm 376 is fitted within an arcuate cam slot 379 of the member 374.

At the very beginning of a cycle, and during the early part of the forward movement of the rack 367, the pawl 372 rocks the member 374, and due to the shape of the cam slot 379, the arm 376 is moved toward the right, to thereby rock the shaft 301. The shaft 301 remains in this rocked position until the beginning of the second half of the cycle, and as the rack 367 begins its return movement, the pawl 372 presses against a second pin 373 of the member 374 and quickly rocks said member back to the position shown in Figure 13, thereby restoring the rockshaft 301 to its normal position. This method of rocking the shaft 301 is more fully described in the hereinbefore referred to co-pending application No. 49,345.

Referring now particularly to Figures 11, 14 and 15, the bail member 300, which as previously described, is slidably keyed to the shaft 301, is provided with a tab 380 and with a tail portion 381. A bifurcated arm 382 is loosely mounted upon the shaft 301 and its bifurcation embraces a rod 383 which, as will hereinafter be described, is a part of the register mounting frame. Loosely mounted on the shaft 301 is a second bail member 384, connected by a link 385 to a side plate 386 of the register mounting frame. The bail member 384 is provided in its lower edge with a slot 387 beneath which the tail 381 of the bail 300 is normally positioned. As previously explained the bail member 300 is moved to the right or to the left of its Figure 14 position for determining an additive or subtractive operation of the register. It will be observed that when said bail member moves to the right, the tab 380 thereof overlies the upper edge of the bifurcated arm 382 and consequently when the shaft 301 is rocked, as aforesaid, in a clockwise direction, the tab 380 will move the arm 382 downward to thereby rock the register mounting frame downward. This downward movement of the register mounting frame moves the pinion 245 of the register wheels down into direct engagement with the differential operator racks 284. When the bail member 300 moves to the left, the tail 381 thereof moves from beneath the slot 387 and underlies the lower edge of the bail member 384, so that a rocking of the shaft 301 at that time will result in the link 385 moving the register mounting frame toward the rear and engaging pinions 245 with the idler gears 247.

The register mounting frame comprises a pair of end plates 386 tied together by the rod 383 and by a rod 388 and a comb 389. The registers may be of the interspersed variety constructed as disclosed in the co-pending application No. 2,654, filed January 16, 1948, in the name of H. L. Pitman, but they do not necessarily have to be of that type. At any rate, as shown in Figure 11, the end plates 386 of each register mounting frame are supported upon rollers 386[1] so that said frame may be readily rocked downward about said rollers or moved rearwardly therealong. Each register comprises a plurality of axially aligned wheels rotatably mounted upon a shaft 390 carried between the end plates 386. A carry-over trip pin 391 is provided on each register wheel in the position intermediate the "0" and "9" positions of said wheels. A carry-over pawl 392 for each register wheel is pivotally mounted upon a supporting shaft 393 and is urged toward the register wheel by a spring 394. Also mounted upon the shaft 393 are a plurality of zero position sensing members 395. The lower end of each carry-over pawl 392 engages one arm of a carry-over lever 396. The carry-over lever 396 for the highest order wheel being connected by a bail 397 to a carry-over portion 398 for the lowest order wheel for a purpose to presently become apparent.

The general operator bar 250 is operatively connected to the rack 367, and as said rack moves forward, and after the selected register has been rocked to engage its wheel either directly with the differential actuator 248 or with the idler gears 247, said general operator bar begins its forward movement. A plurality of levers 399, one of which is shown in Figure 1B, are pivotally carried by the general operator bar 250. There is a lever 399 for each differential actuator rack 248, and during the forward movement of the general operator bar 250 the upper ends of the levers 399 contact the indexed pins 249 and move the differential actuators forward to run the indexed amount into the wheels of the selective register. When a register wheel moves additively from its "9" to its "0" position or subtractively from its "0" to its "9" position, the pin 391 cams the carry-over pawl 392 outwardly and the lower end of said pawl pushes against the upper end of the associated carry-over lever 396 thereby causing its lower arm, as seen in Figure 1A, to raise an associated link 400 from latching engagement with a bar 401, whereupon a spring 402 moves said link forwardly to rock a lever 403 to which the rear end of said link is pivotally connected, in a counterclockwise direction. Inasmuch as it is well known, and is described in detail in the Patent No. 2,192,365, hereinabove referred to, it need not be here particularly described, but it is pointed out that the bar 401 is operatively connected to the rack 367 in such manner that as said rack begins its forward movement, the bar 401 moves a short distance toward the rear of the machine, to thereby cause the links 400 to rock their levers 403 slightly in a clockwise direction and out of engagement with a cross shaft 404.

When the lever 403 is rocked forward by the spring 402, a pin 405 therein becomes positioned in the path of movement of the lower end of the pivotally mounted lever 399 for the next highest denominational order, so that as the lower end of said lever 399 strikes the pin 405, the lever will rock in a counterclockwise direction and give an additional step of movement to its associated actuator rack 248, thereby carrying over a digit to the next highest order wheel. When the highest order wheel of the register is rotated subtractively from its "0" to its "9" position, the movement of the highest order carry-over lever 396 is transmitted through the bail 397 to the portion 398 which operates against a link 400 to position a pin 404 in the path of movement of the lever 399 the upper end of which pushes forward the lowest order rack 248 to introduce the "fugitive one" into the lowest order wheel. This operation of the carry-over mechanism and the "fugitive one" mechanism is more fully explained in a co-pending application No. 45,372, filed August 20, 1948, in the name of H. L. Pitman, as well as in the said patent No. 2,192,365, and need not be further explained herein.

As previously explained the state-control slides 291 for the selected registers move forward from the position shown in Figures 1A and 1B, before the computing cycle begins. These state-control slides are restored during the second half of the cycle in the following manner. A transverse bar 406 overlies all of the state-control slides, and links 407, only one of which is shown, are connected to said bar at one end and at their other ends are pivotally connected to arms 408 fixed to a transverse shaft 409 to which shaft is also fixed an arm 410, to which is pivotally connected a draw link 411. The draw link 411 is provided with a step 412, and as the general operator bar 250 approaches the end of its return movement it strikes the step 412 and pulls the link 411, and consequently the transverse bar 406, toward the rear. The bar 406 picks up pins 413 provided upon each of the state-control slides and returns any slides which have moved forward, to their home position wherein the latches 290 and 316 again engage said state-control slides. Suitable means, not shown, kicks the link 412 downward at the very end of the cycle to allow said link and the transverse bar 406 to be restored by a suitable spring to the position shown in Figures 1A and 1B.

*Reverse computing*

It has been previously mentioned that the operator can manually change the automatic selection of the registers, so that in any column wherein the registers are automatically selected for addition they may be caused to operate subtractively, and vice versa. This is done by operation of a Reverse Compute key 414, shown in Figures 18 and 19. The key 414 is carried by a slidably mounted key stem 415 the lower end of which rests upon a pin 416 provided upon one arm of a three-armed lever 417 pivotally mounted on a stationary pivot 418. Depression of the Reverse Compute key 414 rocks the lever 417, and a pawl 419 pivotally mounted upon one arm thereof strikes a pin 420 provided upon a pivotally mounted member 421. The member 421 has pivotally connected thereto one end of a link 422 the opposite end of which is pivotally connected to an arm 423 fixed to a rockshaft 424, as shown in Figures 16 and 18. Another arm 425 fixed to the rockshaft 424 is connected by a link 426 to the hereinbefore referred to arm 348. Thus, when the Reverse Compute key is operated, the link 426 pulls down on the arm 348 to institute a machine cycle, as previously explained. It will of course be understood, that since the purpose of the Reverse Compute key is to change the operation of the registers from their automatic selection, said key must be operated before the normal computing cycle takes place, and before an amount is indexed in the differential actuators and that therefore, the cycle instituted by the depression of the Reverse Compute key is a "blank" or non-computing cycle. During this "blank" cycle the state-control bars 291 for the selected registers are drawn back to their home position in the manner previously described, but since the registers are still under automatic selection any latches 290 or 316 which have been withdrawn, remain out of engagement with said state-control slides and they immediately return to the same forward position that they were in before the "blank" cycle took place.

Referring now to Figure 20, it will be seen that when the three-armed lever 417 is rocked by depression of the Reverse Compute key, a pin 427 provided in one arm thereof moves forward in a slot 428 provided in a slide 429, thereby allowing a spring 430 connected between said slide 429 and said three-armed lever 417 to move said slide forward into engagement with a segment 431 fixed to the above referred to shaft 370. The slide 429 is provided with a shoulder 432 which, as the segment 431 rotates counterclockwise during the first half cycle, comes to rest against a square stud 433 to position the extreme right hand end of said slide in the path of return movement of the segment 431. The segment 431, being fixed to the shaft 370, moves in the same manner as the segment 369 also fixed to said shaft, and during the second half cycle said segment consequently returns to its Figure 20 position and, in doing so, strikes the end of the slide 429 and rocks said slide upward about the pin 427 as a pivot. This rocking of the slide 429 causes its left hand end to press down on a pin 434 provided upon a bail 435 and rocks said bail in a clockwise direction, as viewed in Figure 20, about its pivot 436. A member 437 is connected to the bail 435 and a spring 438 extends between the member 437 and a slide 439, so that as the member 437 moves downward due to the rocking of the bail 435, the slide 439 is moved downward and its lower end presses against a pin 440 provided upon an arm 441 fixed to a rockshaft 442, shown in Figures 15 and 20.

The rockshaft 442 has fixed thereto a plurality of collars 443, each of which is provided with a tab 444 overlying a pin 445 provided upon each of the cam followers 295. Thus, at the end of the "blank" cycle, and while the state-control slides 291 are in their home positions, the shaft 442 is rocked to thereby rock the followers 295 and position the heads 396 thereof within the cam slots of the lower cam plate 294. As may be seen in Figure 12, the cam slot in the plate 294 is curved oppositely from the cam slot in the plate 293, and therefore, as the state-control slides 291 move back to their automatically selected positions, the follower 295, and consequently the bail member 300, is moved in the direction opposite to which it would be moved if the head of the follower 295 were positioned within the cam slot of the upper plate 293. The above described means for positioning the heads 296 of the cam followers 295 within the cam slots of the lower cam plates 294 is more fully described in the co-pending application Serial No. 49,345, previously referred to.

There is one other operation which is performed upon depression of the Reverse Compute key, and that is that as the three-armed lever 417 is rocked, a pin 446 therein engages a nose 447 provided upon the upper arm of a member 448, as best seen in Figures 18 and 20. The member 448 is connected to one end of a pivotally mounted link 449, to the other end of which is pivotally connected a link 450 the opposite end of which is pivotally connected to a bail member 451. A portion 452 of the bail member 451 underlies one end of an arm 453 pivotally connected at its opposite end to the upper end of an arm 454 the lower end of which is fixed to a rockshaft 455. Pivotally connected to the arm 453 is a dog 456, and a light spring 457 interconnects the dog 456 and the arm 453 and normally holds an ear 458 of said dog against the upper edge of the arm 453. When the Reverse Compute key 414 is operated, the member 448 is cammed downward by the pin 446, to thereby rock the link 449 in a counterclockwise direction about its pivot 459 and accordingly rock the bail member 451 in such manner that the portion 452 thereof moves downward to thereby allow the free end of the arm 453 to move downward and position the upper edge of the dog 456 in a plane beneath the lower one of a pair of contacts comprising a switch 460. A pivotally mounted latch member 461 is mounted adjacent the three-armed lever 417 and as said lever rocks in its counterclockwise direction, a square stud 462 thereon is engaged by the latch member 461 to thereby hold said lever in its rocked position and consequently hold the link 449 in its rocked position and allow the dog 456 to remain in its lowered position.

After the registers are thus conditioned for performing the opposite function from that selected by the automatic controls, the amount is printed and indexed in the usual manner. As the carriage escapes after the printing of the lowest order digit an automatic cycle is instituted, as above described, the carriage coming to rest in the next letter space position. In this next letter space position, the dog 273 rests upon and depresses a control plate 463. This control plate 463 is unlike the control plates 267 in that it is not engaged by the dog 273 during the movement of the carriage through the computing zone, but is only struck after the carriage escapes from the lowest order columnar position. The cam plate 463 is connected through suitable links and levers, diagrammatically represented in Figure 1B by the chain dotted line 464, to the rockshaft 455 and, when said cam plate is depressed, the rockshaft 455 is rocked in a clockwise direction, as viewed in Figures 1B and 18, sufficiently to cause the arm 453 to move the dog 456 to a position directly beneath the switch 460.

Referring now to Figure 13, a pivotally mounted lever 465 is provided with a roller 466 normally positioned within a notch 467 provided in the upper edge of the drive rack 367 and at its upper end is provided with a pin 468 engaging one arm of a pivotally mounted lever 469. The lever 469 is provided on its other arm with a pin 479 engaged with a tab 471 provided upon a transverse blade 472 which is pivotally and slidably mounted at its upper edge in a pair of ears 473, only one of which is shown in Figure 13. As the machine cycle begins, the rack 367 moves forward, as aforesaid, and as the roller 466 rides up out of the notch 467, the lever 465 is rocked in a clockwise direction to thereby rock the lever 469 in a counterclockwise direction, and the pin 470 pressing against the tab 471 swings the blade 472 into a vertical position. Carried by the general operator bar 250 is a member 474 having on its forward end a bevelled portion, as shown in Figure 13. After the blade 472 has been swung into its vertical position, the bevelled end of the member 474 strikes the lower edge of said blade and cams the blade upward. As the blade 472 moves up, its upper edge strikes a projection 475, see Figure 18, provided upon the end of arm 453 and moves the end of said arm upward, thereby causing the upper edge of the dog 456 to close the switch 460.

As will later be more fully explained, the switch 460 is in a circuit including a solenoid 476 mounted, as shown in Figure 1A, upon the tie plate 206 of the removable power unit. The armature 477 of the solenoid 476 is pivotally connected to one end of a pull link 478 the other end of which is provided with a roller 479 resting against one arm of a member 480 similar to the members 232. The member 480 lies directly in line with the member 232 and is like said members except that of course it is not provided with any means for engaging any of the elongated members 229. The member 480 is connected to a type lever in the same manner as the members 232 are connected to the numeral type levers 12, and when the switch 460 is closed, as aforesaid, the solenoid 476 is energized to cause the type lever associated with the member 480 to be actuated and to print a distinctive symbol, thus showing that the amount printed has been entered into a register in the opposite sense to that in which it would normally be entered in that particular column.

During the latter part of the computing cycle following the "blank" reversing cycle, the edge of the segment 431 strikes an edge 481, see Figure 20, of the slide 429, said edge 481 having been positioned as explained in the above referred to co-pending application No. 49,345, in the path of movement of said segment. When the segment 431 strikes the edge 481, it rocks the slide 429 an additional amount, and during this additional movement a pin 482 on said slide engages a tail portion 483 of the latch member 461 to cause said latch member to release the three-armed lever 417, which is then restored to its normal position by a spring 484. The particular symbol printed by the present machine to show that an amount has been entered as a result of a Reverse Computing operation is a lazy-V, as shown in the third line of work on the work sheet in Figure 9.

*Clear sign and Reverse Compute symbol*

The present machine is provided with means for printing a clear sign, but said means need not be described in detail herein because it is the same as described and claimed in the co-pending application of H. L. Pitman, No. 45,372, filed August 20, 1948. In general however, it will be mentioned that after the Reverse Compute symbol is printed, the carriage steps to the next letter space position and in this letter space position the dog 273 continues to depress the cam plate 463 and continues of course to hold the shaft 455 in its rocked position. The operation for printing the Reverse Compute symbol takes place very early in the cycle and during the latter part of the cycle, if the amount entered into the register resulted in clearing the register, a slide 485, Figure 1A, located in alignment with the state-control slides 291, moves toward the rear to thereby rock a shaft 486 in a counterclockwise direction and through an arm 487 fixed thereto raises a member 488 from its normal position shown in Figure 1A. As the member 488 is raised, the upper end thereof is cammed toward the rear by a plate 489 to thereby close a switch 490, shown in Figure 1A. The switch 490 is in a circuit including a solenoid 491 similar to the solenoid 476 and the solenoid 491 is operatively connected through a link corresponding to the link 478 to a member corresponding to the member 480 which is connected with a clear sign or star printing type action, whereby where the solenoid 491 is energized a clear sign will be printed.

Referring now to Figure 9, it will be seen that the work sheet is provided with a Proof column. A proper "proof" may be obtained in a number of different ways, but in general, when the carriage arrives at the Proof column, the operator manually enters the amount which was entered at the beginning of the line in the Old Balance column. As diagrammatically shown in Figure 9, one of the registers into which the "old balance" is entered positively is the register which may be designated C-1, and this register may be termed the "proof" register. As the carriage enters the Proof column, the C-1 register is again selected but in this column, the column unit 262 is provided with a dog which depresses the cam plate 267 controlling subtraction, and therefore, the register will be normally selected automatically to perform subtraction. From the work sheet it will be noted that a star is printed after the amount in the Proof column to indicate that the amount entered resulted in clearing the "proof" register. The third line down in the Proof column shows that a reverse computing operation was performed at that time and it will be seen that the amount is followed by a lazy-V and a star.

The margin stop 137 is so positioned along the bar 35 that as the carriage steps from the letter space position in which the star is printed, said margin stop strikes the counter stop 116 and institutes an automatic carriage return operation, as previously explained. Since, once the margin stop 137 is set, it will thereafter strike the counter-stop 116 whenever the carriage steps toward a particular letter space position, and since it is sometimes desirable to have two symbols printed after an amount and sometimes only one symbol, means has been provided to cause an automatic spacing operation before the printing of the clear sign in the Proof column when the Reverse Compute key is not operated in that column.

Referring now to Figure 1B, a control plate 492, similar in construction to the star printing control plate 463, is connected at its lower end by a pin 493 to a member 494 pivotally mounted upon the control tower 252 and urged by a spring 495 in a clockwise direction. A tab 496 on the member 494 rests against one member of a switch 497. As diagrammatically shown in Figure 9, the column unit 262 for the Proof column is provided with a dog 498 which, as the carriage steps to the letter space position immediately following the printing of the lowest order digit, depresses the control plate 492, thereby closing the switch 497. The switch 497 is connected, as shown in the wiring diagram of Figure 24, in a circuit including a normally closed switch 499 and a solenoid 500, so that as the switch 497 is closed, the solenoid 500 is energized. The solenoid 500 is mounted on the intermediate power unit in line with the solenoids 476 and 491 as shown in Figure 1A and its solenoid is connected to a pull link similar to the pull link 478 connected in the same manner as said pull link 478 to the usual space-bar lever, which lies in alignment with the numeral type levers 12. Thus, in the Proof column, a space is normally automatically provided between the lowest order digit of the amount and the clear sign.

When it is necessary to Reverse Compute in the Proof column, as for example, as shown in the work sheet of Figure 9 when the old balance is a negative amount, the switch 499 is opened thereby breaking the circuit between the switch 497 and the solenoid 500 so that the above described automatic spacing operation will not be performed. Referring to Figure 19, a link 501 is pivotally mounted upon the pin 416 of the lever 417 and is provided with an ear 502 overlying an insulating member 503 provided upon the lowermost contact of the switch 499 so that when the Reverse Compute key 414 is operated the switch 499 is opened.

*Silencing controls during tabulation*

It has been previously mentioned that the various control plates, denominational jacks, cycle trip lever, etc., are normally in a raised position so that they are in the path of movement of the various control dogs provided upon the column units 262. Referring to Figure 16, mechanism will now be explained whereby the various automatic control plates, etc., are lowered during tabulating movements of the carriage and then raised to contact the column unit dogs after the carriage comes to rest. A link 504 is pivotally connected at one end to the lever 92 which, as previously explained, is rocked during tabulation in a direction to cause the escapement dog 47 to be withdrawn from engagement with the pin wheel 46. At its opposite end, the link 504 is pivotally connected to an arm 505 fixed to a rock shaft 506 to which is also secured an arm 507. The arm 507 is provided at its free end with a pin 508 resting against the end of one arm of a lever 509 pivotally mounted at 510 on the framework of the machine and provided on another arm with a stud 511 resting upon the upper end of a slide 512. A foot portion 513 of the slide 512 overlies a pin provided upon an arm 514 fixed to the hereinbefore referred to shaft 424. Loosely mounted upon the shaft 424 is a bail member 515 provided with an ear 516 overlying the foot 513 of the slide 512 and connected by a pin-and-slot connection 517 on a second bail member 518 also loosely mounted on the shaft 424. The bail member 518 is provided with a portion 519 which is adapted to be moved into the path of movement of a square stud 520 fixed to the disk 352.

When a tabulation run of the carriage is instituted as previously described, the lever 92 rocks in a clockwise direction, as viewed in Figure 16, thereby pulling the link 504 and rocking the shaft 506 in a counterclockwise direction. As the shaft 506 rocks in a counterclockwise direction, the arm 507 thereon rocks the lever 509 which depresses the slide 512 and the foot 513 thereof rocks the shaft 424 and through the link 426 institutes a cycle, as previously explained. When the shaft 424 is rocked, an arm 521 secured thereto rocks the bail 518 in a direction to place the portion 519 thereof in the path of movement of the stud 520. As the cycle reaches approximately ⅞ completion, the stud 520 strikes against the portion 519 to thereby rotate the disk 352 sufficiently to move the hereinbefore referred to clutch pawls 360 out of engagement with the ratchet 358 and thereby open the main cycle clutch and interrupt the cycle at approximately ⅞ completion.

Secured to the main cycle shaft 353 is a toothed disk 522 to which is secured a cam 523. Mounted upon a shaft 524 is an arm 525 urged by a spring 526 in a counterclockwise direction. A spring 527 extends between the arm 525 and a pin provided upon a member 528, and an ear 529 on said arm engages an edge of the member 528. The member 528 is provided with a pin 530 positioned to be engaged by the cam 523 as the cycle shaft begins its operation. The member 528 is provided with an ear 531 underlying a stepped portion of an arm 532 fixed to a stub shaft 533, and the ear 531 normally holds the arm 532 and consequently the shaft 533 in the position shown in Figure 16.

A pair of arms 534 are secured to the shaft 513 and a shaft 535 is carried by the arms 534. It is upon the shaft 535 that the hereinabove referred to bell cranks 321 and 344 are mounted. Also secured to the shaft 533 are a second pair of arms 536 each of which is pivotally connected to an arm 537. The arms 537 support the hereinbefore referred to shaft 277 which carries the rods 271 and the control plates 267. At the very beginning of the cycle, the cam 523 operates against the pin 530 to move the ear 531 of the member 528 from beneath one of the steps of the arm 532, thereby allowing said arm to drop under the pull of gravity. The dropping of the arm 532 and the consequent rotation of the shaft 533 causes the shafts 277 and 535 to be lowered, as will be readily understood, and since those two shafts support the various control plates, denominational jacks etc., the control plates, denominational jacks etc., will be lowered to a position wherein they will not be struck by the dogs of the column unit 262 as the carriage is tabulated to the denominational position within the next column. The cycle is interrupted, as aforesaid, by the stud 520 contacting the portion 519 of the bail member 518, while the various control plates, denominational jacks etc., are still in lowered position.

At the end of the tabulating movement, the bail member 87, Figure 1B, is rocked to lower the projected tabulator stop 82 and the pin 91 moves away from the end of the lever 92. A spring 538 connected to the link 504 thereupon rocks the lever 92 to permit the escapement dog 47 to re-engage the pin wheel 46, and at the same time rocks the shaft 506 in a clockwise direction as viewed in Figure 16, to move the pin 508 of the arm 507 away from the end of the lever 509. With the lever 509 thus freed, a spring 539 connected between the arm 348 and the framework of the machine, swings said arm 348 upward and, through the link 426, moves the arm 425 and the shaft 424 in a clockwise direction. As the shaft 424 rocks clockwise, the arm 521 carried thereby moves away from the bail member 518 and the arm 514 lifts up on the foot 513 and through the nose 516 rocks the bail member 515 about the shaft 424 to remove the portion 519 from engagement with the stud 520, thus permitting the main cycle clutch to become reengaged and allow the cycle to complete. During the portion of the cycle remaining, a pin 540 provided upon the disk 522 contacts a lip 541 on the arm 522 and restores said arm to the position shown in Figure 16. When the arm 532 is thus raised, the spring 526 pulls the member 528 back to its home position and positions the tab 531 thereof beneath the stepped portion of the arm 532. The various control plates, denominational jacks etc., are thus raised, and those beneath the control dogs on the column unit 262 for the particular column are held down, to thereby determine the function of the machine in that column.

*Carriage rebound checking*

In order to eliminate any possibility of the carriage rebounding from the denominational position to which it is desired to tabulate, the following mechanism is provided. A rack 542, see Figures 5 and 16, extends along the rear edge of the typewriter carriage 31, and a pawl 543 is pivotally mounted upon the typewriter frame at 544, said pawl being provided with a rack engageable tab 545. Pivotally connected to the pawl 543 is a member 546, the lower end of which is held in engagement with a pin 547 provided upon a pivotally mounted arm 548 by means of a spring 549 extending between said pin 547 and a pin 550 provided upon the member 546. The free end of the arm 548 is provided with a notch within which is normally held a pin 551 provided upon the upper end of an arm 552 fixed to the rockshaft 506. As the link 504 is moved toward the left, as viewed in Figure 16, as previously explained, at the beginning of a tabulating movement, the arm 522 is rocked in a counterclockwise direction. The pin 551 rides out of the notch in the arm 548 and cams said arm downward and the spring 549 thereupon pulls down on the member 546 to engage the tab 545 with the rack 542 to prevent said rack, and consequently the carriage, from rebounding after it reaches its tabulating position. At the end of the tabulating movement the rockshaft 506 is rocked in a clockwise direction, as previously explained, and the pin 551 on the arm 552 again positions itself within the notch provided in the arm 548. A spring 554 extending between the pin 551 and a pin 555 on the arm 548 then restores the arm 548, the member 546 and the pawl 543 to the positions shown.

Silencing controls during carriage returns

In order to prevent register selection and to save wear and tear on the denominational jacks, means has been provided to lower the control plates, denominational jacks etc., during carriage return operations. The end of the link 146 is shown in Figure 16, and it will be recalled that the end of said link moves upward during carriage return. One arm 556 of a pivotally mounted three-armed lever 557 overlies the end of the link 146 and another arm of said lever is provided with a tab 558 which rests upon the upper end of a push link 559, the lower end of which is pivotally connected to an arm 560 secured to the shaft 424. As the link 146 moves upward, the three-armed lever 557 is rocked in a clockwise direction to push down on the link 559 and consequently rock the shaft 524 in a counterclockwise or cycle instituting direction, to institute a machine cycle, as previously explained. This cycle will be interrupted at approximately ⅞ completion in the same manner as a tabulation instituted cycle and will not be allowed to complete until the carriage return movement is completed and at the end of the cycle the link 146 moves down to permit a spring 561 extending between the link 559 and the frame of the machine to restore the shaft 424 to its normal position. The third arm of the three-armed lever 557 is connected by a pin-and-slot connection 562 to an arm 563 fixed to one end of a rockshaft 564 to the other end of which is fixed an arm 565 underlying a nose 566 provided upon the member 546, and as the lever 557 is rocked during carriage return movements, the arm 565 raises the member 546 to thereby positively hold the pawl 543 out of engagement with the rack 542.

Printing in red

In order that negative entries may be readily distinguished by an examination of the completed work sheet, the machine is equipped with means for causing the amounts printed in certain columns, to appear in red. This is done by providing a control plate 567, shown in Figure 3, and providing a dog such as the dogs 272 for depressing said control plate in the credit columns. As shown in Figure 3, the control plate 567 rests upon a tab provided upon a lever 568. The lever 568 is pivotally mounted upon a slidably mounted link 569 within the control tower 252, and said slide is carried by a rod 570 mounted in a manner similar to the rods 271 and adapted to lower the control plate 567 during cycles of the machine. The lever 568 is pivotally connected to one end of a link 571, the opposite end of which is pivotally connected to a bail member 572. As seen in Figures 3 and 5, one arm of the bail member 572 underlies a nose 573 provided upon a member 574 fixed to a shaft 575 and urged by a spring 576 in a counterclockwise direction as viewed in Figure 5. Fixed to the shaft 575 is an arm 577 provided with a pin 578 overlying one arm of a pivotally mounted member 579. The member 579 is provided with a tab 580, and a spring 581 extending between a member 579 normally holds an edge of a member 582 against the tab 580. The member 582 is provided with an adjustable screw 583, the end of which is in contact with a ribbon vibrating member 584. The ribbon vibrating member 584 is operated in the same manner as disclosed in the patent to Sagner, No. 2,369,315, and the upper end of said member is provided with a pair of notches adapted to engage one or another of a pair of pins 585 and 586. When the ribbon vibrator is in the position shown in Figure 5 with its upper end engaged with the pin 585, the machine prints in black, and when the ribbon vibrator is engaged with the pin 586, the machine will print in red, in the manner fully explained in the said Sagner patent. When the cam plate 567 is depressed, the member 579 is rocked in a clockwise direction, as viewed in Figure 5, and the spring 581 pulls the member 582 along with it, with the screw 583 pressing against the ribbon vibrator 584 to move the upper end thereof out of engagement with the pin 585 and into engagement with the pin 586. A crank shaft 587 extends through an enlarged opening provided near the upper end of the ribbon vibrating member 584 and a knob, not shown, provided upon the front of the typewriting unit, may be manually operated to restore the ribbon vibrating member to engagement with the pin 585 during the time that the cam plate is held depressed, in case it is desired for any reason to print in black in a credit column.

Numeral key lock

Since operation of a numeral key during a cycle would be very apt to cause a tie-up of the machine, as will readily be appreciated, a numeral key lock has been provided which is effective during cycling operations to prevent the depression of a numeral key. Referring now to Figures 1A, 7, 16 and 18, a pair of brackets 588 are secured to the brackets 210 and the plate 212 of the intermediate power section and a shaft 589 is rockably mounted between said brackets. The shaft 589 has secured thereto a plurality of members 590, the upper ends of which are normally out of operative alignment with square studs 591 provided upon the elongated members 229 of the intermediate section, as seen in Figure 1A. An arm 592 is secured to the shaft 589 and at its upper end is provided with an elongated slot within which is fitted a headed pin 593 provided upon one end of a link 594. A spring 595 extends between a pin on the arm 592 and a pin on the link 594. At its opposite end, the link 594 is provided with a bail portion 596 mounted upon a shaft 597, and said link is connected by a pin-and-slot connection 598 to one arm of a member 599 loosely mounted upon the shaft 349 and connected by means of a stud 600 to an arm 601 also loosely mounted upon the shaft 349. The free end of the arm 601 normally rests upon the square stud 351 of the disk 352 and at the beginning of the cycle the said arm is cammed upwardly to thereby rock the member 599 in a counterclockwise direction, as viewed in Figure 18, to thereby pull the link 594 toward the right, as viewed in said figure. The spring 595 pulls the arm 592 along, to thereby rock the shaft 589 and position the upper ends of the members 590 beneath the square studs 591 of the elongated members 229. A link 602 interconnects the bail portion 596 of the link 594 and a cam follower arm 603 which is provided upon its free end with a roller 604 held by a spring 605 in engagement with a disk 606 fixed to the main cycle shaft 353. As the cycle gets under way the roller 604 is cammed out of a notch 607 on the disk 606, within which it is normally positioned, and rides along the circumferential edge of said disk. This movement of the roller 604 causes the bail portion 506 to remain rocked until the very end of the cycle and thereby holds the members 590 beneath the studs 591. With the members 590 positioned beneath the studs 591 it is apparent that a numeral key cannot be depressed.

All-clear signal

In order that the operator may determine that all of the registers in the machine are clear before beginning a series of computations, the present machine is equipped with what may be termed an all-clear key, shown in Figure 3 at 608. The key 608 is carried by a key stem which is slidably mounted upon one of the side plates 200 of the computing section of the machine, and is connected by a pin-and-slot connection 609 to one arm of a pivotally mounted lever 610, the other arm of which is pivotally connected by a pin-and-slot connection 611 to one arm of a pivotally mounted lever 612. The lever 612 is pivotally connected at 613 to a slide 614, the rearmost end of which is normally in abutment with a rod 615 fixed to the hereinbefore referred to rockshaft 455. A spring 616 connected to the slide 614 normally holds the parts in the position shown. Pivotally mounted upon the slide 614 is a member 617, the lower edge of which is normally held in engagement with a pin 618 on said slide by means of a light spring 619 extending between a pin on the member 617 and the pin 618. A bail member 620 is pivotally mounted upon the machine framework and a portion 621 thereof is held in engagement with the hereinbefore referred to members 395 by means of a light spring 622 connected to said bail member. When all of the wheels of all of the registers stand at "0," the bail member 620 will be rocked to the position shown in Figure 3 wherein a stud 623 thereon is out of the path of movement of a tab 624 on the stem of the key 608.

There is a special column unit 262, which may be positioned at any desired location along the programming unit 266, and this special column unit is provided only with a dog for contacting the control plate 463, and then only in one letter space position. As previously mentioned, when the control plate 463 is depressed, the shaft 455 is rocked, and from Figure 3, it will be observed that when said shaft is rocked, the rod 615 will be removed from abutment with the slide 614. If, at that time, all of the wheels of all of the registers stand at "0," so that the bail member 620 is rocked to the position shown, it will be possible to depress the key 608. Upon depression of the key 608, the slide 614 moves to the left, as viewed in Figure 3, and one end of the member 617 contacts a tab 625 provided upon an arm 626 fixed to the above referred to shaft 486, to thereby rock said shaft and raise the member 488 to close the clear sign printing switch 490, to thereby cause a clear sign to be printed, as previously described. After the key 608 is depressed far enough to rock the shaft 486, further depression of said key brings one end of the lever 612 into contact with a pin 627 on the member 617, and said member is thereby rocked slightly in a counterclockwise direction far enough so that the arm 626 may swing back to its lowered position to position the tab 625 over the top of the end of the member 617. With this arrangement, the switch 490 will only be closed momentarily even though the key 608 is held down, and consequently only one clear sign will be printed.

*Total printing—positive totals*

As previously mentioned, the machine of this invention is capable of automatically printing the totals standing in the registers. Referring now particularly to Figures 18, 21 and 22, a Total key is indicated at 628, said key being carried by a slidably mounted key stem 629 which is connected by a pin-and-slot connection 630 to one arm of a bell crank 631 the other arm of which is pivotally connected to a long link 632. One end of link 632 is shown in Figure 18 and the other end thereof is shown in Figure 22.

Referring now particularly to Figure 22, the link 632 is pivotally connected to an arm 633 fixed to one end of a rockshaft 634 to the upper end of which is fixed an arm 635 provided with a pin 636. The pin 636 underlies the lower edge of a member 637, said member being pivotally mounted upon the hereinbefore referred to shaft 215 and being fixed by means of a collar 638 to an elongated link 639, similar to the elongated links 229. The link 639 is associated by means of a hook member 640, similar to the hook members 230, with an actuator 641 having a toothed pawl 642 adapted to be moved into driving engagement with the fluted shaft 218 of the intermediate power section. The actuator 641 is pivotally connected to a bell crank 643 mounted upon the hereinbefore referred to shaft 216, and said bell crank is fixed by means of a collar 644 to an arm 645. The arm 645 is pivotally connected to one end of a link 646 the other end of which is provided with a pin 647 underlying a cam arm 648 fixed to a rockshaft 649. There is an arm 650 fixed to the rockshaft 649 and the upper end of said arm lies adjacent a pin 651 provided upon one end of a lever 652 pivotally mounted upon a stationary supporting bracket 653. The lever 652 is connected by pin-and-slot connection 654 to one arm of a member 655 also pivotally mounted upon the bracket 653 and said member is provided with a roller 656 and is connected by means of a pin-and-slot connection 657 to a projectible stop member 658 having an enlarged head portion 659. It will be apparent that by means of the mechanism which has been described, when the Total key 628 is depressed, the member 637 will be rocked in a counterclockwise direction as viewed in Figure 22, to thereby engage the actuator 641 with the fluted shaft 218, and that link 646 will consequently be driven toward the left, whereupon the shaft 649 will be rotated to cause the member 655 to rock in a counterclockwise direction.

Rocking of the member 655 causes a number of operations to be performed simultaneously. Due to the pin-and-slot connection 657, the stop member 658 will be raised to position the enlarged upper end 659 thereof in the path of a projection 660 provided upon each of the column units 262, as shown in Figure 1B. As the member 658 is raised, an ear 661 provided upon the enlarged head portion 659 becomes positioned over a stationary ledge 662 to thereby hold said member in its raised position until the projection 660 of the column unit strikes the head portion 659. As shown in Figures 1B and 16, the roller 656 rests against the hereinbefore described arm 552, and consequently rocking of the member 655 causes the link 504 to be driven toward the left, to thereby release the carriage from the control of the escapement mechanism and permit the carriage to move freely in tabulating direction. As particularly well shown in Figures 1B and 22, a lever 663 is pivotally mounted upon the fixed bracket 653 and is provided at one end with a pin 664 resting against the lower arm of lever 652 and at its upper end is provided with a shoulder 665 in abutment with one end of a slidably mounted comb 666. The comb 666 engages most of the control plates 267, and as the lever 652 rocks in a clockwise direction it causes the lever 663 to rock in a clockwise direction and the shoulder 665 drives the comb 666 toward the rear, to thereby rock the control plates 267 to which said comb is connected, to a position wherein the upper edges of said control plates are in alignment with a different set of column unit dogs 272; so that all registers normally selected are not selected, but only one register is selected whenever an automatic total is to be printed. The dogs 272 which select the register from which the totals are printed are indicated by chain dotted lines in Figure 9.

Pivotally mounted upon the control tower 252, is a latch member 667 which is urged in a clockwise direction, as viewed in Figure 22, by means of a light spring 668. When the comb 666 moves to the rear, the right hand end of the latch member 667 drops down behind a shoulder 669 provided upon said comb and holds the comb in its rearward position. There is another latch member 670 pivotally mounted upon the bracket 653, and as the lever 663 rocks, the latch member 670 engages behind an ear 671 on said lever to hold the lever rocked and hold the comb 666 in its rearward position. The purpose of the latches 667 and 670 will presently become apparent.

Articulated to the left hand end of the latch member 667 is an upstanding slide 672. The upper end of the slide 672 is positioned, as shown in Figure 23, in the path of movement of the hereinbefore referred to denominational depressing tappet 319. Should the total key be depressed while the carriage is in an intermediate denominational position within a column, the tappet 319 will, as the carriage moves out of that column and toward the next column, depress the slide 672 and thereby release the latch 667 from engagement with the shoulder 669. However, the control plates 267 will remain in their locked position because of the latch 670.

In the same manner as explained in the co-pending application Serial No. 182,195, filed August 30, 1950, in the name of G. K. Schulz, a headed interponent member 673 is carried by comb 666 and, as said comb moves to the rear, the head portion of the interponent member is positioned between a pin 674 provided upon a jack 675 and pin 676 provided upon a jack 677. The jack 677 does not project into the path of movement of the tappet 319, but as the stop member 660 strikes the enlarged head of the member 658, said tappet comes to rest in a position to depress the jack 675, as more fully explained in the said co-pending application Serial No. 182,195. Through the pins 674 and 676 and the interponent 673, depression of the jack 675 results in depression of the jack 677, as will readily be understood. As the projection 660 strikes the head of the member 658 said member is moved sufficiently to remove the ear 661 thereof from engagement with latch 662 and a spring thereupon restores the member 658 to the position shown in the drawings. As the member 658 is restored, the pin-and-slot connection 657 causes the member 655 to be rocked in a clockwise direction, and the roller 656 thereupon releases its pressure on the arm 552 and allows the escapement mechanism to resume control of the carriage. At the same time, the roller 656 presses against an arm 678 of the latch member 670 to thereby release said member from engagement with the arm 671. If, at the time the Total key is depressed, the carriage is not located within a computing zone, release of the latch 670 will not affect the control plates, because the latch 667 will hold the comb 666 in its rearward position. If, however, the carriage were in a computing zone at the time of depressing of the Total key, so that the latch 667 had been previously released, as described, then the release of the latch 670 will result in the control plates resuming their normal position, but this will not affect the operation of the machine, because the register selecting plates 267 will have already been depressed to make the necessary selections before the stop 660 strikes the head portion 659 of the member 658.

The jacks 675 and 677 are shown in Figure 21, and it will be observed that the lower end of the jack 677 rests upon a push link similar to the push links 320. The lower end of push link 679 is connected to one arm of a bell crank 680 mounted upon the hereinbefore referred to shaft 535 and similar to the bell cranks 321. The other arm of the bell crank 680 bears against one end of a rod 681 which is articulated to a rockable cross blade 682 similar to the blades 323. Also articulated to the blade 682 are a plurality of distributive racks 683 and each rack 683 is provided with a coupler 684. The couplers 684 are similar to the couplers 325 and are raised into position of operative alignment with corresponding slides 685 in the same manner as the couplers 325 are raised into alignment with the differential actuator racks 248. Thus, for any register which is selected for total printing, the slide 685 corresponding to said register will be moved forward.

For each register wheel there is a feeler member 686 which is normally held in the position shown in Figure 1A by a bar 687. The bar 687 is connected through links 688 and arms 689 to a rockshaft 690, and a link 691 is connected at its forward end to said bar and at its rearmost end is slidably mounted upon a stud 692 and is provided with an ear 693 over which normally is positioned a latch 694. A spring 695, connected to one of the arms 689, urges the bar 687 toward the front of the machine. As shown in Figure 21, the left hand rack 683 is provided with a tail portion 696 in engagement with a pin carried on the end of an arm 697 fixed to one end of a rockshaft 698, to the other end of which is fixed the latch member 694. When the blade 682 is rocked as aforesaid, the tail portion 696 rocks the shaft 698 and lifts the latch member 694 out of engagement with the ear 693 of link 691, whereupon the spring 695 moves the bar 687 toward the front of the machine.

Associated with each set of feelers 686 are a set of interponent plates 700. A rod 701 extends through aligned openings in each set of interponent plates and the ends of each of said rods are carried by plates 702, the interponent plates normally being held up in the position shown in Figure 1A by the rod 701. Pivotally connected to each feeler 686 is an arm 703 having a tab 704 and an ear 705. When the bar 687 moves forward, the ears 705 of the arms 703 abut an edge of the interponent plates 700 and thereby prevent the feelers from moving forward. Each of the plates 702 is provided with an ear 706 beneath which is hooked a latch member, and there is a pivotally mounted two-armed lever 708 for each set of interponent plates, the upper end of each lever 708 bearing against a latch member 707 and the lower end of each lever being in contact with a pin 709 provided upon each of the slides 685. When the slide 685 for the selected register moves forward, the pin 709 rocks the associated lever 708, and the upper end thereof forces the latch member 707 from beneath the ear 706 of one of the plates 702, whereupon said plates drop by gravity, and the said interponent plates 700 associated therewith also drop. This allows the feelers 686 for the selected register to move forward under the urge of individual springs 699 and engage the digit stops 246, the feelers moving forward differential amounts dependent upon the angular rotation of the register wheels.

As the link 691 moves forward as aforesaid, a pin 710 located, as shown in Figures 1B and 21B, upon the ear 693 strikes against a cam portion 711 of a latch member 712. The latch member 712 is loosely mounted upon the shaft 698 and normally overlies a square stud 713 provided upon an arm 714 fixed to a cross shaft 715 and urged in a counterclockwise direction as viewed in Figure 1B by a spring 716. The forward movement of the slide 691 thus lifts the latch member 712 from engagement with the stud 713 and permits the spring 716 to rock the shaft 715 in a counterclockwise direction. Secured to the shaft 715 is a cam 753, shown in Figure 12, and as said shaft rocks, the cam wipes against an ear 754 on the bail member 307 to thereby cause the selected register to be conditioned for subtraction.

Secured to the shaft 715 is an arm 717 having a pin-and-slot connection 718 with one end of a member 719, the opposite end of which is pivotally connected to one end of a rod 720. The opposite end of the rod 720 is articulated to a rockable blade 721. The member 719 is provided with a pin 722 and one of the racks 683 is provided with an upstanding arm 723. As the shaft 715 rocks, the arm 717 moves the member 719 downward and the pin 722 wipes against an edge of the upstanding arm 723 to thereby cause the rod 720 to move slightly forward and rock the blade 721. Articulated to the blade 721 are a plurality of racks 724. The racks 724 are similar to the racks 324 except that they are not provided with couplers such as the couplers 325 and the forward end of each rack 724 is in constant operative alignment with the differential actuator rack 248 for the highest or ultradenominational wheel of the registers. Thus, as the racks 724 move forward the highest order differential actuator 248 for each register is moved forward to indexing position.

When the interponents 700 drop down as aforesaid, and the feelers 686 move forward into engagement with the register wheels, a lower camming edge 725 of each interponent plate is positioned in the path of movement of one of the differential actuators 248. As the highest order differential actuators move forward as aforesaid, the actuator for the register from which the total is being taken, strikes the camming edge 725 of the highest order interponent plate 700 and cams said plate upward. The upper edge of the interponent plate thereby presses against the ear 705 of the pivoted arm 703 and raises said arm, whereupon the tab 704 thereon, which has become positioned beneath one of a plurality of blades 727, raises the corresponding blade to thereby close a switch 728.

There is a blade 727 and a switch 728 for each digit from "0" to "9" and there is also one additional blade 727 and switch 728, the purpose of which will presently be explained. The blades 727 are located within the computing section of the machine and the switches 728 are mounted upon the intermediate power section.

Referring now particularly to Figures 18 and 24, there are a group of switches generally indicated at 729 mounted upon the side of the control tower 252. The various contacts of these switches 729 are designated by the letters A, B, C, D, E, F, G, H and I. A switch operating slide 730 is mounted upon the control tower 252 and is urged toward the left by a spring 731, but is normally held in the position shown in the drawing by means of a pivotally mounted latch member 732. A link 733 is pivotally connected at its upper end to the latch member 732 and at its lower end is pivotally connected to a pivotally mounted two-armed lever 734. The other arm of the lever 734 is provided with a pin 735 resting upon a cam 736 secured to the above referred to shaft 715. As the shaft 715 rocks as aforesaid, the cam 736 rocks the lever 734, and through the link 733, causes the latch member 732 to release the slide 730 for movement toward the left, to thereby condition the switches 729 for the total printing operation. A bell crank 737 is pivotally mounted upon the framework of the typewriting section and one arm thereof is provided with a pin 738 normally out of contact with a tab 739 of the slide 730 but into contact with which said tab moves when the slide 730 moves to the left. The other arm of the bell crank 737 is connected by a pin-and-slot connection 740 to one arm of a pivotally connected lever 741, the other arm of which is pivotally connected to one end of a link 742, the other end of which is secured to the hereinbefore referred to link 50. As may be seen in Figure 3, and as is shown diagrammatically in Figure 24, a member 743 is pivotally secured to the slide 730 and one arm of said member is pivotally connected to a slide 744 by means of a pin 745. As seen in Figure 24, the pin 745 projects far enough to cooperate with an insulating member 746 provided upon the contact H of the switch 729, so that when the slide 730, and consequently the slide 744, is in its normal position, the pin 745 holds the contacts G—H apart.

Assume now that the total standing in the register is a positive amount; say for example, 150 00 dollars.. Each of the registers is provided with eleven wheels, and as will be understood these wheels will stand at: 00000015000. As the highest order differential actuator 248 moves forward as aforesaid, the pins 249 thereof assume their indexing position beneath the blades 326 and the highest order interponent plate 700 is raised to close the switch 728 representing the "0," which is the digit standing in the highest order wheel. It is of course not desirable to print this "0" or any of the other "0's" appearing to the left of the first significant figure, which in the example given is "1." Referring now to the wiring diagram of Figure 24, it will be observed that when the switch 728 representing "0" is closed, a circuit will be completed through the contacts G—H of the switches 729 and the normally closed switch 499 to the "space" solenoid 500, the contact H having been allowed to move into engagement with the contact G due to the hereinabove described leftward movement of the slide 730 and the consequent movement of the pin 745 away from the insulating member 746.

It should here be pointed out that operation of the space bar in the Underwood All-Electric typewriter operates the escapement mechanism in a different manner than does the operation of a type action. In this typewriter, operation of the space bar causes an actuator similar to the actuators 18 to be moved into engagement with the fluted shaft 21 and the space bar actuator is connected by means of a link 747, shown in Figures 1A and 1B, to an arm 748 fixed to a shaft 749 to which is also fixed an arm 750, the upper end of which is in engagement with a tail portion 751 of the escapement dog rocker member 48. This operation of the escapement from the space bar does not result in any movement of the link 50, said link being connected to the rocker 48 with a one-way connection. Thus, the sensing of a "0" in the highest order wheel results in a spacing operation only.

As the carriage steps to the next denominational position, the tappet 319 releases the jack 675 thereby allowing the spring device 332 to restore the highest order differential actuator rack 248 to its normal position wherein its pins 249 are out of alignment with the blades 326. As the carriage comes to rest in the next denominational position, the tappet 319 depresses the next highest order denominational jack 318 to move the next highest order differential actuator rack forward and thereby raise the next highest order interponent plate 700. In the example given, the next wheel of the register also stands at "0" so that the "0" switch 728 is again closed to complete a circuit to the space solenoid 500. This step-by-step sensing and spacing continues until the carriage arrives at the first significant figure position, which will be the "1." As the interponent plate 700 for this hundreds of dollars denominational order is raised, the blade 727 corresponding to the switch 728 representing the "1" is raised to thereby close the "1" switch. As shown in the wiring diagram of Figure 24, when the "1" switch 728 is closed, a circuit is completed to the "1" solenoid 236 and, as previously explained, this will result in the printing of a "1" and a concurrent indexing of a "1" pin 249 in the differential actuator rack 248 for that denominational order. As the "1" is printed the link 50 operates the escapement in the manner previously explained and at the same time pulls forward on the link 742 and through the lever 741 and bell crank 737 pushes the slide 730 back to its normal position, wherein the switch G—H is opened and the switch H—I is closed. The latch member 732, under the urge of a spring 752 engages the slide 730 and holds it in its rearward position. The carriage then escapes to the next denominational position wherein the "5" is printed and indexed, as will be understood. After the carriage escapes from the printing of the "5" another "0" is sensed, and the "0" switch 728 is consequently closed; but because of the fact that the slide 730 has been restored to open the switch G—H and close the switch H—I, the space solenoid will not be energized, but rather a circuit will be completed from the "0" switch 728 through the switch H—I to the "0" solenoid 236, as shown in the wiring diagram, to thereby cause a "0" to be printed and indexed in the manner previously explained. The remaining "0's" are printed and indexed in the same manner and, as the carriage escapes from the printing of the last "0," a cycle is instituted as previously explained to cause the printed and indexed amount to be run into the register subtractively to thereby clear said register.

Should an automatic total be taken from a clear register or from a register containing less than ten cents, the following mechanism shown in Figure 3 becomes effective. The denominational jack 318 for the tens of cents denomination is connected by a pin-and-slot connection 755 to a pivotally mounted lever 756 and said lever is provided with a tab 757 which underlies an arm of the member 743. If the register is clear, it is desirable to print two zeros, and if the register contains only a units of cents amount, it is desirable to print a zero before the units amount. When the tappet 319 depresses the denominational jack 318 for the tens of cents denomination, the lever 756 is rocked, to thereby rock the member 743 and move the slide 744 sufficiently to open the switch G—H and close the switch H—I, even though the slide 730 is still in its shifted position because of the fact that a significant figure will not have been reached.

*Negative totals*

Should the amount in the register be a negative amount, say for example a minus 150–00 dollars, the wheels of the register will stand at 99999984999. The extreme left hand wheel has a slightly different arrangement of digit stops than do the other wheels, and when that wheel stands at "9," the feeler 686 associated therewith does not move forward quite as far as do the feelers sensing ordinary "9's." When the feeler 686 for the extreme left hand denomination senses a "9," the tab 704 of its arm 703 becomes positioned beneath the eleventh blade 727, previously referred to, and consequently when said blade is raised, a switch 728 represented on the wiring diagram by the letters CS, is closed. The CS switch is a case shift operating switch, and when this switch is closed, a circuit including the switch A—B is completed to a case shift solenoid 758. Referring now to Figure 3, the armature of the case shift solenoid 758 is pivotally connected to a latch member 759. The latch member 759 is normally in engagement with one arm of a pivotally mounted lever 760 to hold said lever in the position shown in Figure 3 against the action of a spring 761. Pivotally connected to the lever 760 is a push link 762 provided at its upper end with a stud 763 against which stud one edge of the hereinbefore referred to dog 183 rests. When the solenoid 758 is energized, the latch 759 is released and the spring 761 rocks the lever 760 to thereby raise the push link 762 and rock the dog 183 to thereby institute a case shift operation, as previously explained. As the type basket 170 is lowered during the case shift operation, an arm 764 thereon rocks a bell crank 765, shown in Figure 18, and a link 766 connected to said bell crank is moved toward the rear. There is a pin 767 provided upon the end of the link 766 in abutment with one end of a slide 768 and, as the machine is case shifted, the slide 768 is moved toward the rear. As the slide 768 moves rearwardly, a pin 769 thereon pushes against an insulating button 770 provided upon the switch contact B, to thereby open the switch A—B and close the switch B—C, thus completing a circuit from the CS switch 728 to a solenoid 236 for setting the 9-Pin 249 in the differential actuator rack 248.

The 9-Pin solenoid 236 is shown in Figure 22, and said solenoid is associated with one of the hereinbefore referred to elongated members 229 which in turn is associated with an actuator 226 and the bell crank 222. The bell crank 222 for this 9-Pin linkage is not associated with a type action but does carry a pendant 223 and is provided also with a switch actuating arm 771. Referring again to the wiring diagram of Figure 24, when the 9-Pin solenoid 236 is energized, the 9-Pin will be set in whatever differential actuator 248 has been moved forward to pin setting position. As the 9-Pin bell crank 222 is rocked, the switch operating arm 771 opens a switch 772 and closes a switch 773. As may be seen in the wiring diagram, closing of the switch 773 completes a circuit to the space solenoid 500 through the switch 499, whereby a spacing operation is obtained as above described.

As the carriage steps from the ultra-denominational or negative quantity indicating position, the tappet 319 of course comes to rest upon the jack 318 for the next highest order. The "9" sensed in this order is different from the "9" sensed in the ultra-denominational order, so that instead of the CS switch 728 being closed, the "9" switch 728 is closed.

Referring again to the wiring diagram, it will be recalled that the slide 730 moved to the left at the beginning of the total taking operation and consequently an insulating portion 774 on the slide 744 moved away from the contact D of the switch 729. There is an insulating pin 775 provided upon the slide 730 and as said slide moves to the left, the contact D, which is in the form of a leaf spring, is permitted to assume a vertical position. There is a light weight interponent member 776 pivotally mounted and provided with ears located between the contacts D and F and as the contact D straightens up the contact F also straightens up, the interponent being swung about its pivot. When the slide 768 moves to the right as viewed in the wiring diagram, a pin 777 provided thereupon presses against an insulating button provided upon the contact E and moves said contact to a position of engagement with the contact F. Thus, when the "9" switch 728 is closed, a circuit is completed through the switch E—F to the 9-Pin solenoid 326. This results in the setting of the 9-Pin in the corresponding differential actuator and in another spacing operation. This indexing of "9's" and the step-by-step spacing of the carriage continues until the hundreds of dollars position is arrived at, whereupon in the example given, an "8" is sensed. Upon the sensing of an "8," the "8" switch 728 is closed, thereby completing a circuit to the "8" solenoid 236.

It will be recalled that earlier in the specification mention was made of the fact that the numeral type heads 28 are provided with complemental type, that is, the upper case type are the nines complements of the lower case type. Thus, when the "8" solenoid 236 is energized, the normal "8" type action will be operated, but due to the fact that there has been a case shift operation, a "1" will be printed. However, since the "8" type action is operated, the "8" pin 249 will be indexed. After the printing of the "1" the carriage steps to the next denominational position wherein the "4," in the example given, is sensed, to thereby energize the "4" solenoid 236. Because of the case shift, the actuation of the normal "4" type action will result in the printing of a "5" and an indexing of a "4." The printing of the first figure results in the restoration of the slide 730, as aforesaid, so that when the "9" is sensed in the next denominational position to close the "9" switch 728, a circuit will be completed through the switch D—E to the "9" solenoid 236 to thereby energize the "9" type action. Due to the case shift operation, this actuation of the normal "9" type action results in a printing of a "0." The upper case type may have, in fact do have in the present machine, a different slant than the upper case type, so that negative totals may be readily distinguished upon inspection of the work sheet. Thus, the second amount in the Balance column of the work sheet of Figure 9, may be readily recognized as a credit balance.

Whether the total is positive or negative, as the carriage escapes from the printing of the lowest order digit, a cycle is instituted. Since the register will be cleared during this cycle, a clear sign or star will be automatically printed after the amount in the manner previously explained. The last amount appearing in the Proof column of the work sheet shown in Figure 9 is an automatic total, and that is why the star appears in the letter space immediately following the lowest order digit. The control plate 492, which is the plate which normally gives the automatic space in the Proof column, rocks to the rear during total taking operations in the same manner as do the register selecting plates 267, and no control dog is provided upon the column unit 267 for the Proof column in a position to cooperate with said plate in its rocked position.

As the cycle begins, and the rack 367 begins its forward movement said rack operates upon a roller 775 which as shown in Figure 1A is mounted upon the end of a crank arm 776 fixed to the rockshaft 690 to thereby rock said shaft in a clockwise direction. Rocking of the shaft 690 results in a rearward movement of the bar 687 to thereby restore the feelers 686 and, as said bar approaches its normal position, its rear edge catches under a shoulder 777 provided upon the interponent lifting plates 702 to thereby restore the interponent plates 700 to their normal position. When the bar 687 reaches its home position, the latch 694 drops down behind the ear 693 of the slide 691 to retain the bar 687 to which said link is connected. At approximately ½ cycle, a roller 778 shown in Figures 21 and 21A, provided upon the crank arm 363, strikes against a pivotally mounted cam 779 thereby rocking said cam and rocking also an arm 780 which is operatively connected to said cam. The arm 780 is fixed to the rockshaft 715, and as the roller 778 strikes the cam 779 said shaft is restored to its normal position. Referring to Figure 3, it will be observed that as the bar 367 begins its forward movement to rock the lever 465 as aforesaid, the pin 468 thereon wipes against a portion of the lever 760 to thereby restore said lever to a position wherein it is engaged by the latch member 759, thus permitting the type basket 170 to be restored to lower case position.

*Sub-totals*

Sub-totals, as well as totals, may also be taken. Referring now to Figures 18 and 22, a Sub-total key 781 is slidably mounted adjacent the Total key 628 and at its lower end said Sub-total key is connected by means of a bell crank 782 to one end of a link 783, the opposite end of which is pivotally connected to one arm of a pivotally mounted lever 784. The other arm of the lever 784 underlies a nose 785 of a lever 786, said lever being provided with a tab 787 which underlies the hereinbefore referred to member 637. When the Sub-total key is operated, the lever 784 is rocked, and the end thereof cams the nose 785 of the lever 786 upward, whereupon the tab 787 raises the member 637 to institute a total printing operation, in the manner previously explained. As the lever 786 is rocked, a tab 788 thereon, shown in Figures 7 and 18, moves from beneath a pivotally mounted arm 789 and said arm thereupon drops by gravity to position a hooked portion 790 thereof behind a square stud 791 provided upon the hereinbefore referred to link 646. As the link 646 is drawn to the left, as viewed in Figure 18, in the manner previously explained, the square stud 791 draws the arm 789 along with it to thereby rock a bail member 792, to which said arm is pivotally connected. The bail member 792 is operatively connected to a member 793, one end of which rests upon a pin 794 provided upon one of the previously mentioned slides 269, as shown in Figures 18 and 22. Thus, as the link 646 is drawn to the left, as viewed in Figure 18, the end of the member 793 presses down on the pin 794 and lowers the slide 269 to which said pin is connected. The particular slide 269 to which the pin 794 is connected, corresponds to the plate 377 of the patent to Pitman, No. 2,372,681, and operation of said slide prevents the state-control slides 291 from moving forward in the same manner as explained in said patent, whereby the register wheels will not be rotated during the succeeding cycle and the amount, though printed in the same manner as are the totals, will not be run out of the register.

Having thus described the invention, what is claimed is:

1. An accounting machine of the class described comprising a typewriting section including a plurality of numeral keys, a rotatable power shaft and type actions engageable with said power shaft by said numeral keys for actuation thereby, a computing section including a register, indexable differential actuators for said register, indexing means for said differential actuators and amount sensing means for sensing amounts standing in said register, an intermediate section securable in a fixed relation on said computing section and having means thereon to support and position said typewriting section, linkages in said intermediate section operatively associated with said numeral keys, a rotatable power shaft on said intermediate section, actuators engageable by said linkages with the power shaft of said intermediate section for operation thereby, means connected to said actuators to operate said indexing means of said computing section, switches in said intermediate section operable by the amount sensing means, operating means in said intermediate section controlled by said switches to operate said linkages, and members in said typewriting section operable by the actuators of said intermediate section to operate said numeral keys when said actuators are engaged with the power shaft of said intermediate section under control of said operating means to thereby cause an operation of said type actions.

2. An accounting machine of the clas described comprising a typewriting section including a plurality of numeral keys, a rotatable power shaft and type actions engageable with said power shaft by said numeral keys for actuation thereby, a computing section including a register, indexable differential actuators for said register, indexing means for said differential actuators and amount sensing means for sensing amounts standing in said register, an intermediate section securable in a fixed relation on said computing section and having means thereon to support and position said typewriting section, linkages in said intermediate section operatively associated with said numeral keys, a rotatable power shaft on said intermediate section, means drivingly connecting the power shaft of said typewriting section with the power shaft of said intermediate section, actuators engageable by said linkages with the power shaft of said intermediate section for operation thereby, means connected to said actuators to operate said indexing means of said computing section, switches in said intermediate section operable by the amount sensing means, solenoids on said intermediate section wired in circuits with said switches and controlled thereby, said solenoids having armatures located in proximity to said linkages, said armatures being operable upon energization of said solenoids to operate said linkages, and members in said typewriting section operable by the actuators of said intermediate section to operate said numeral keys when said actuators are engaged with the power shaft of said intermediate section to thereby cause an operation of said type actions.

3. A bookkeeping machine comprising a typewriting section having numeral type actions and keys for instituting actuation of said type actions, a letter feed carriage urged in letter feed direction, a rotatable platen carried by said carriage, escapement mechanism operable upon each actuation of a type action to allow a letter space movement of said carriage, a computing section associated with said typewriting section and having a register including a plurality of wheels, indexable differential actuator racks for said register, idler gears in mesh with said racks, automatic control means including a traveling programming unit, means connecting said programming unit to said letter feed carriage for movement therewith, means for indexing said differential actuator racks in accordance with the operation of said numeral keys whereby when a numeral key is depressed the digit corresponding to said key will be printed and indexed, general operator mechanism for moving said differential actuator racks, means operable by said automatic controls to condition said register wheels for movement into direct engagement with said racks or into engagement with said idler gears during operation of said general operator, manually operable reversing means to reverse the conditioning of said register wheels as determined by said automatic controls, means normally operable by said automatic controls to operate said escapement to cause said carriage to skip a letter space after the printing of the lowest order digit of an amount, and means operable upon operation of said manually operable reversing means to prevent the letter space skipping operation and to print a symbol in the space normally skipped.

4. A bookkeeping machine comprising a typewriting section having numeral type actions and keys for instituting actuation of said type actions, a letter feed carriage urged in letter feed direction, a rotatable platen carried by said carriage, escapement mechanism operable upon each actuation of a type action to allow a letter space movement of said carriage, a computing section having a register including a plurality of wheels, indexable differential actuator racks for said register, idler gears in mesh with said racks, automatic control means including a traveling programming unit, means connecting said programming unit to said latter feed carriage for movement therewith, a power section located between said typewriting section and said computing section, cooperating means in said power section and said computing section for indexing said differential actuator racks in accordance with the operation of said numeral keys, whereby when a numeral key is depressed the digit corresponding to said key will be printed and indexed, general operator mechanism for moving said differential actuator racks, means operable by said automatic controls to condition said register wheels for movement into direct engagement with said racks or into engagement with said idler gears during operation of said general operator, manually operable reversing means to reverse the conditioning of said register wheels as determined by said automatic controls, means normally operable by said automatic controls to operate said escapement to cause said carriage to skip a letter space after the printing of the lowest order digit of an amount, and means operable upon operation of said manually operable reversing means to prevent the letter space skipping operation and to print a symbol in the space normally skipped.

5. For use in an accounting machine including a typewriter having power driven numeral type actions mounted in a framework, said framework including a base portion having supporting elements thereon, and a computing section including indexing means for differential actuators mounted between side plates, said side plates being held together by members extending between the upper edges thereof; an adapter unit comprising a frame, means on said frame for locating said unit on the members extending between the upper edges of the computing section, means on the frame for receiving the supporting elements of said typewriter, means for cooperating with the numeral type actions, means for cooperating with the indexing means, and power means for transmitting impulses from the means for cooperating with the numeral type actions to the means for cooperating with the indexing means.

6. For use in an accounting machine including a typewriter having power driven numeral type actions mounted in a framework, said framework including a base portion having supporting elements thereon, and a computing section including indexing means for differential actuators mounted between side plates, said side plates being held together by members extending between the upper edges thereof; an adapter unit comprising a frame, means on said frame for locating said unit on the members extending between the upper edges of the computing section, means on the frame for receiving the supporting elements of said typewriter, power means, indexing means operating means, an actuator pivotally connected to said indexing means operating means, means for moving said actuator to a position wherein said actuator will be actuated by said power means, and electrical means for operating said means for moving said actuator.

7. For use in an accounting machine including a typewriter having power driven numeral type actions mounted in a framework, said framework including a base portion having supporting elements thereon, and a computing section including a register and digit sensing means for said register mounted between side plates, said side plates being held together by members extending between the upper edges thereof; an adapter unit comprising a frame, means on said frame for locating said unit on the members extending between the upper edges of the computing section, means on the frame for receiving the supporting elements of said typewriter, means for cooperating with a numeral type action, an actuator for said last mentioned means, a rotary power shaft for actuating said actuator, electrical means for cooperating with the digit sensing means of the computing section, and means responsive to operation of said electrical means for moving said actuator into engagement with the rotary power shaft.

8. For use in an accounting machine including a typewriter having power driven numeral type actions mounted in a framework, said framework including a base portion having supporting elements thereon, and a computing section including a register and digit sensing means for said register mounted between side plates, said side plates being held together by members extending between the upper edges thereof; an adapter unit comprising a frame, means on said frame for locating said unit on the members extending between the upper edges of the computing section, means on the frame for receiving the supporting elements of said typewriter, a plurality of numeral type action operating members, an actuator associated with each of said type action operating members, a linkage corresponding to each of said actuators, power means, a solenoid corresponding to each of said linkages and adapted to operate said linkages when energized to thereby move a corresponding actuator into a position to be operated by said power means, an electric circuit including said solenoids and a plurality of switches, said switches being adapted to be selectively operated by the total sensing means of the computing section, the switches and solenoids being so associated that when one of said switches is operated a corresponding solenoid will be energized to thereby affect the operation of the corresponding actuator as aforesaid.

9. For use in an accounting machine including a typewriter having power driven numeral type actions mounted in a framework, said framework including a base portion having supporting elements thereon, and a computing section including total readout means for a register and indexing means for differential actuators mounted between side plates, said side plates being held together by members extending between the upper edges thereof; an adapter unit comprising a frame, means on said frame for locating said unit on the members extending between the upper edges of the computing section, means on the frame for receiving the supporting elements of said typewriter, a plurality of indexing means operating means for cooperating with the indexing means of the computing section, an actuator for each of said indexing means operating means, a rotary power shaft, an electric circuit including a solenoid corresponding to each of said actuators and a switch corresponding to each solenoid, said switches being mounted on said frame in a position to cooperate with the total readout means of the computing section when said adapter unit is in position upon said computing section, and means operable by each solenoid upon the closing of the associated switch to move the actuator corresponding to said solenoid into engagement with said rotary power shaft.

References Cited in the file of this patent

UNITED STATES PATENTS

| | | |
|---|---|---|
| 853,709 | Meier | May 14, 1907 |
| 1,285,297 | Marshall | Nov. 19, 1918 |
| 1,309,276 | Dennis | July 8, 1919 |
| 2,160,487 | Pitman | May 30, 1939 |
| 2,365,527 | Dennis | Dec. 19, 1944 |
| 2,398,395 | Pitman | Apr. 16, 1946 |
| 2,453,932 | Pitman | Nov. 16, 1948 |
| 2,590,777 | Kupper | Mar. 25, 1952 |